(12) United States Patent
Refaeli et al.

(10) Patent No.: US 12,163,599 B2
(45) Date of Patent: Dec. 10, 2024

(54) NON-CONTACT ACTUATION ASSEMBLY

(71) Applicant: Wall to Wall, LLC, Hayward, CA (US)

(72) Inventors: Nir Refaeli, Kiryat Ono (IL); Mati Matityahu Aharonyan, Petakh Tikva (IL)

(73) Assignee: Wall to Wall, LLC, Hayward, CA (US)

( * ) Notice: Subject to any disclaimer, the term of this patent is extended or adjusted under 35 U.S.C. 154(b) by 269 days.

(21) Appl. No.: 17/905,788

(22) PCT Filed: Apr. 19, 2021

(86) PCT No.: PCT/IL2021/050440
§ 371 (c)(1),
(2) Date: Sep. 7, 2022

(87) PCT Pub. No.: WO2021/214753
PCT Pub. Date: Oct. 28, 2021

(65) Prior Publication Data
US 2023/0111883 A1 Apr. 13, 2023

(30) Foreign Application Priority Data

Apr. 23, 2020 (IL) .......................................... 274196

(51) Int. Cl.
*F16K 31/08* (2006.01)
*E04C 2/52* (2006.01)
(Continued)

(52) U.S. Cl.
CPC ............ *F16K 31/088* (2013.01); *E04C 2/525* (2013.01); *F24D 3/142* (2013.01); *F24D 19/0075* (2013.01)

(58) Field of Classification Search
CPC ...... F16K 31/088; F16K 5/0442; E04C 2/525; E04C 2/521; F24D 3/142; F24D 19/0075; F24D 3/14; Y02B 30/00
See application file for complete search history.

(56) References Cited

U.S. PATENT DOCUMENTS 9,057,453 B2 6/2015 Pitchford et al.
9,683,756 B2 6/2017 Barmore

FOREIGN PATENT DOCUMENTS

CN 1045853 C 10/1999
CN 204013466 U 12/2014
(Continued)

*Primary Examiner* — Mohamad A Musleh
(74) *Attorney, Agent, or Firm* — Morrison & Foerster LLP

(57) ABSTRACT

A non-contact actuation assembly configured to operate a communication line of an infrastructure system through a panel having an external face configured to be directed into an interior of a building structure, and an opposite internal face, said assembly comprising; an actuator configured to be positioned adjacent said external face by a user during operation, said actuator comprising an actuating member constituted by at least one of a magnetic member and a magnetizable member; and an operator configured to be disposed adjacent said internal face during operation, and control communication at said communication line, said operator comprising an operating member constituted by a matching one of said magnetic member and said magnetizable member; wherein upon said positioning of said actuator adjacent said external face, in register with said operator, said actuating member and said operating member are configured to be magnetically coupled such that said operator is switchable, upon disposition of said actuator member with respect to said external face, at least between a first state in which communication in said communication line is established and a second state n which communication in said communication line is obstructed.

10 Claims, 11 Drawing Sheets

(51) Int. Cl.
*F24D 3/14* (2006.01)
*F24D 19/00* (2006.01)

(56) References Cited

FOREIGN PATENT DOCUMENTS

| | | | |
|---|---|---|---|
| CN | 205479597 U | 8/2016 | |
| CN | 109642678 A * | 4/2019 | ............ F16K 1/221 |
| JP | 2002227960 A * | 8/2002 | |
| JP | 2008-232359 A | 10/2008 | |
| WO | 2020/012484 A2 | 1/2020 | |

* cited by examiner

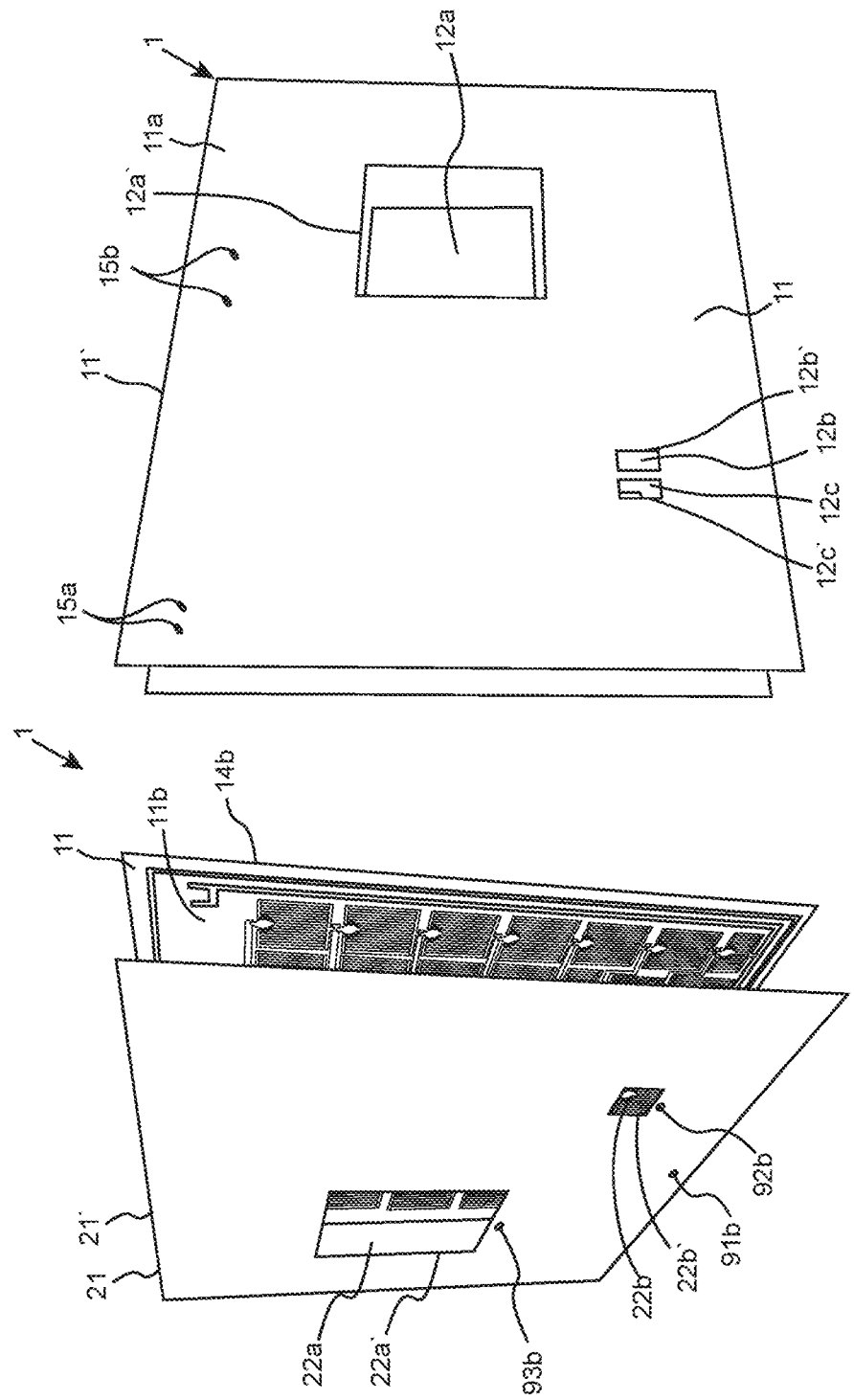

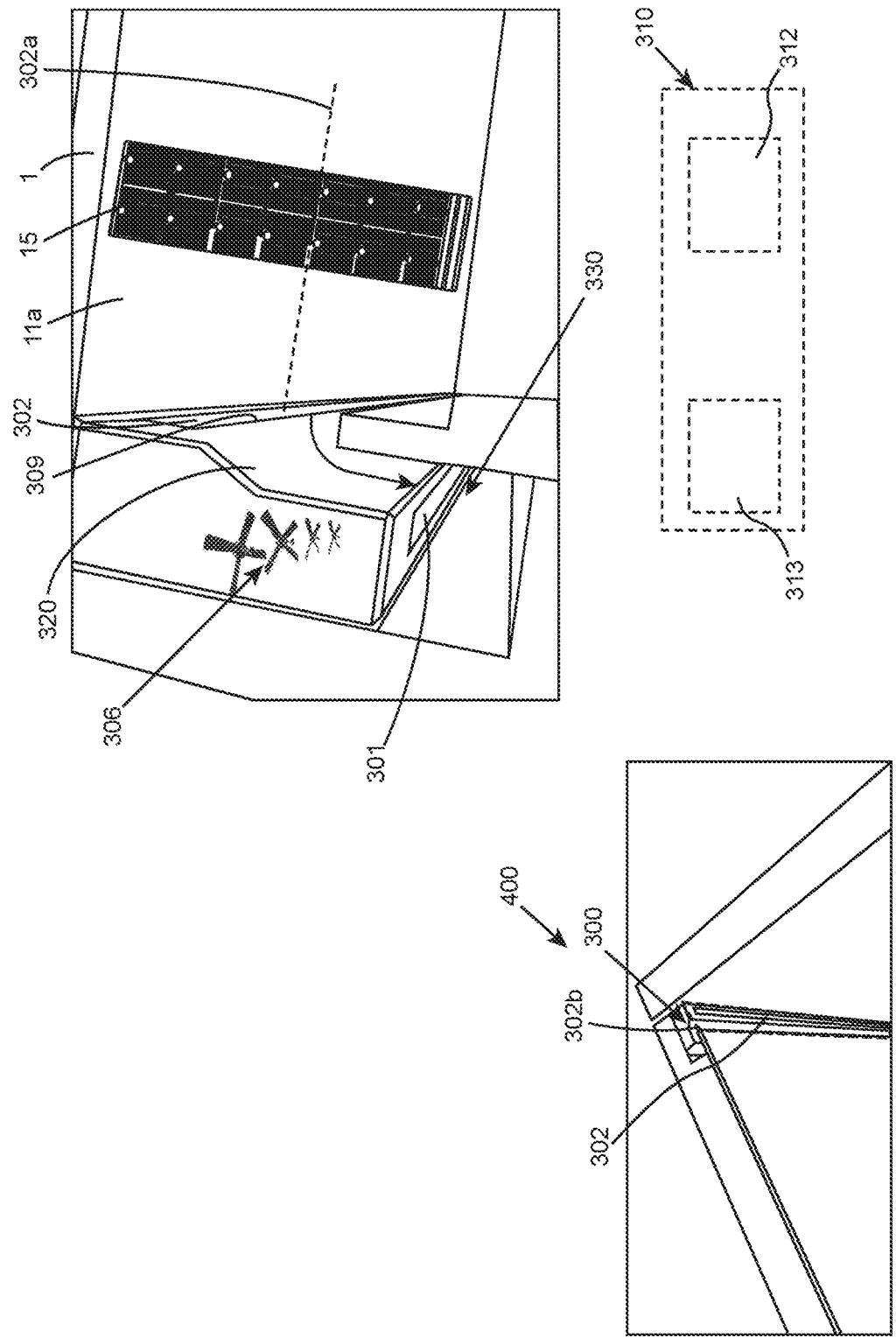

NON-CONTACT ACTUATION ASSEMBLY

TECHNOLOGICAL FIELD

The presently disclosed subject matter concerns thermal walls and applications thereof, particularly a radiating walls, and air convection systems for use therewith, as well as to remotely operated switches/valves.

BACKGROUND ART

References considered to be relevant as background to the presently disclosed subject matter are listed below:
WO 2020/012484; and
U.S. Pat. No. 9,683,756.
Acknowledgement of the above references herein is not to be inferred as meaning that these are in any way relevant to the patentability of the presently disclosed subject matter.

BACKGROUND

Hydronic radiant thermal systems utilize circulated heated/cooled liquid, e.g, water, to generate heat radiation flux into building structures. The water flows through a series of radiators or through a shaped network of pipes embedded within walls of these rooms, and thereby turn them into heat radiating/absorbing walls. In some cases these walls have an integrally formed shaped network of conduits embedded therein, through which the liquid can flow. In some cases, these walls are made of interconnected pre-fabricated panels being mass produced with identical dimensions and structure, each formed with an identical respective portion of the network of conduits. Such arrangement makes it difficult to assemble a radiating wall with an efficiently distributed network of conduits. Especially a when the wall has a non-uniform structure, e.g., formed with window openings, utility socket openings, or includes areas where radiation therethrough is undesired.

U.S. Pat. No. 9,683,756 discloses a modular thermal panel which includes a heat exchanger having connected top and bottom plates with channels formed there between for receiving a heat exchange fluid. An architectural tile (e.g., a paver, stone, acoustic tile, or any other architectural element) can rest on the top of the modular thermal panel, while an insulator panel is positioned below the modular thermal panel. The heat exchanger can transfer heat between the architectural tile and the heat exchange fluid to either cool or heat the architectural panel.

It is also appreciated that the operation of such radiating walls associated with hydronic radiant thermal systems, or any other radiating walls, can be improved by operating in conjunction therewith heat convection systems.

To operate the network of conduits or any other communication line of an infrastructure system embedded in these walls, e.g., plumbing, electricity, vacuum, hand operated actuators, e.g., switches or handles are fixed to a surface of the wall and damage the aesthetic appearance of the surface of the wall.

GENERAL DESCRIPTION

The presently disclosed subject matter is related to pre-fabricated construction components such as walls, ceilings, and floors being manufactured separately at a manufacturing site before being transported to a construction site, where they are assembled into a building structure, e.g., a room, a house, a residential building, etc.

These prefabricated construction components, can be provided with components of a utility infrastructure embedded therein, such as parts of a hydronic radiant thermal system, parts of an electricity system, parts of a plumbing system, or parts of an air convection system, particularly with at least one communication line associated therewith. In addition or alternatively, the prefabricated construction components, can be provided with at least partially embedded operative components configured to operate these communication lines, such as, switches, valves, taps.

When the infrastructure is a hydronic radiant thermal system, the construction components can be walls embedded with a closed conduit configured to facilitate circulation of heated/cooled liquid therethrough.

According to a first aspect of the presently disclosed subject matter, there is provided a thermal wall for use with a hydronic radiant thermal system, said thermal wall having at least one utility opening, and a closed conduit formed in the thermal wall configured to facilitate liquid flow therewithin. The thermal wall comprises:

a thermal panel formed with at least one panel opening corresponding in dimensions and location to the utility opening of the thermal wall, having an internal face formed with a channel bypassing said at least one panel opening, and an opposite external face configured to be directed into an interior of a building structure; and a cover layer sealingly connected to the internal face of the thermal panel so as to cover at least a portion of the channel, and thereby form the closed conduit. The cover layer has at least one cover opening corresponding in dimensions and location to the utility opening of the thermal wall, which is positioned in register with the at least one panel opening of the thermal panel, thereby forming said utility opening in said thermal wall.

According to a second aspect of the presently disclosed subject matter, there is provided a method of manufacturing a thermal wall for use with a hydronic radiant thermal system, said thermal wall having a closed conduit formed in the thermal wall configured to facilitate liquid flow therewithin. The method comprises steps of:

(i) obtaining a panel workpiece having an external face configured to be directed into an interior of a building structure, and an opposite internal face;

(ii) receiving data indicative of a predetermined geometry of a liquid flow path according to which a channel is to be formed in the panel workpiece;

(iii) receiving data indicative of a reference location on the panel workpiece in which at least a portion of the channel is to be formed;

(iv) forming by a machining tool the channel at the internal face, through the reference location according to the predetermined geometry, so as to obtain a thermal panel with said internal face and said external face;

(v) obtaining a cover layer having corresponding dimensions to the thermal panel; and (vi) sealingly connecting the cover layer to the internal face of the thermal panel such that at least a portion of the channel is covered, thereby obtaining the thermal wall with the closed conduit.

The term 'cover layer' as used herein the specification and claims, refers to any single layer or a plurality of layers comprised by the thermal wall other than the thermal panel, positioned at the side of the internal face of the thermal panel, optionally including a frame structure, optionally structured from tracks and studs, for example, the tracks can provide horizontal support, e.g. by horizontal laid beams, and the studs can provide vertical support, e.g. by vertical laid beams. The frame structure can be configured to provide structural support and stability for basic load carrying of the building structure, according to construction engineering requirements. Constructing the frame structure from tracks and studs can create cavities within the frame structure. These cavities can be filled with heat insulating material.

The term 'utility opening' as used herein the specification and claims refers to any intentional opening in the thermal wall. The utility opening can optionally be an opening designated for passing infrastructure therethrough, e.g., utility socket openings such as electricity sockets, vacuum sockets, pipeline sockets, or a hatch in the thermal wall such as window or a door.

The closed conduit can be configured to facilitate liquid flow of heated/cooled liquid, and thereby facilitate radiation/absorption of heat to/from the interior of the building structure, through the external face of the thermal panel.

It should be appreciated that in the first aspect, the channel can be formed according to a predetermined geometry of a liquid flow path, as defined above with respect to the second aspect.

The predetermined geometry can be defined for bypassing liquid free zones of a the thermal panel, i.e., for passing around or along them, without crossing.

The liquid free zones can be associated with areas of the thermal panel through which it is desired to avoid, or impractical to perform, radiation/absorption of heat. Such areas may be, for example, panel openings to be formed in the thermal panel corresponding to the one or more utility openings of the thermal wall. The utility openings location and dimensions can be determined according to an architectural plan of the thermal wall which can also comprise data indicative of location and dimensions of the external boundaries of the thermal wall.

The one or more liquid free zones can further include areas on the thermal panel through which radiation/absorption of heat is undesired due to considerations related to interior design of the building structure. In other words, the liquid free zones can also refer to usable areas of the thermal panel, through which it is undesired to radiate/absorb heat, e.g., areas designated for mounting wall decorations or wall mounted furniture/devices thereon. According to an example, at least some of the liquid free zones correspond to an internal design plan of the building structure including location and dimensions of certain furniture to be placed in the building structure potentially obstructing radiation/absorption of heat therebeyond, or in proximity thereto.

The liquid flow path can be a 2D path defined on the internal face of the thermal panel. The geometry of the liquid flow path can be adaptive near narrow/complex areas of the internal face, i.e., areas proximal to a panel boundary of the thermal panel, corresponding to an external boundary of the thermal wall, or to a liquid free zone, thereby creating an efficiently distributed radiation/absorption of heat thereal ong.

According to an example, the liquid flow path is designed with a plurality of sub-paths constituting building blocks of the liquid flow path, branching and converging back to a main stream line, similarly to a flow of a natural river. Each of the sub-paths can have:

at least one inlet flow path;
at least one outlet flow path;
a plurality of distributary paths, optionally extending generally parallel each other;
a branching path in which said at least one inlet flow path branches into the plurality of distributary paths; and
a converging path in which said plurality of said distributary paths converge into said at least one outlet flow path.

According to an example, the inlet flow path and the outlet flow path both constitute a portion of one main stream line, which branches off into the distributary paths through the branching path, and converge back into the main stream line through the converging path.

The liquid flow path can comprise at least three of those sub-paths, where at least two of which are generic sub-paths with predetermined dimensions, and at least one of which is an adaptive sub-path with adaptive dimensions which are different from the predetermined dimensions. Such distribution into types can ease the design work of the thermal panel, i.e., the design work of the liquid flow path, as it allows repetitive use in the generic sub-paths, up to a point where they do not fit within the operational area and where the adaptive sub-path/s can be used to fill up the void. In such a manner, the adaptive sub-path/s can be those bordering the liquid free zones and/or the panel boundaries. In the design process, the step of defining the liquid flow path can include determining a number of generic sub-paths to be applied therein while taking into consideration dimensions of the operational area, and the predetermined dimensions. It can be that the generic sub-paths occupy more of the operational area than the adaptive sub-path/s, and/or constitute a majority of the entire liquid flow path.

The method of designing can be performed automatically by a computer, according to a predetermined algorithm.

Unless specifically stated otherwise, as apparent from the following discussions, it is appreciated that throughout the specification discussions utilizing terms such as "determining", "defining", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities.

The term "location and dimensions", as well as the term "geometry", and declension of the term "design", used in the specification and claims should be expansively construed to cover any design data indicative of hierarchical physical design (layout) of a specimen. Such data can be provided by a respective designer and/or can be derived from the physical design (e.g. through complex simulation, simple geometric and Boolean operations, etc.). Design data can be provided in different formats as, by way of non-limiting examples, GDSI1 format, OASIS format, etc. The design data can be presented in vector format, grayscale intensity image format or otherwise.

The geometry of the liquid flow path can fully define the geometry of the channel and thereby the close conduit, or to define a general path for forming the channel, not including reference to parameters such as changing width or depth of the channel. These parameters can be defined separately during designing of the wall.

For example, a respective portion of the channel associated with an inlet portion of the liquid flow path can be designed to a wider extent than the rest of the channel, or be shaped, optionally as a circle, to facilitate incorporation of a valve. Such valve can be used to selectively allow fluid communication into the respective channel sub-portion.

The method of manufacturing the thermal wall can further comprise steps of: receiving data indicative of location and dimensions of one or more utility openings to be formed in said thermal wall; and forming corresponding panel openings and cover openings in said thermal panel and in said cover layer, thereby obtaining the utility openings in the thermal wall.

Manufacturing limitations such as those related to the size of the articles to be processed, can require adaptations of the method of manufacturing. According to an example of the presently disclosed subject matter, the panel workpiece comprises a plurality of panel sub-workpieces, each of which configured to be formed with a respective portion of said channel. In such a case, the step of forming the channel can include forming on each panel sub-workpiece its respective sub-portion of the channel, thereby obtaining a panel sub-piece.

Further in such a case, the method of manufacturing can comprise a step of connecting the panel sub-pieces to each other such that their respective sub-portions of the channel are aligned in a continuous manner.

According to an example, one or more of the panel sub-pieces can be unique, with a distinct channel sub-portion formed therein.

The method of manufacturing the thermal wall can further comprise a step of positioning a sealing layer, optionally a sealing adhesive, at a border area between two of the respective sub-portions of the channel, to form leak free continuity therebetween.

In addition to the sealing layer, a funnel element can be connected at said border area facilitating liquid passage between the respective portions of the channel. The funnel element can have a cross sectional shape corresponding to a cross sectional shape of at least one of the channel sub-portions between which it facilitates liquid passage, and can extend from one channel sub-portion into the other.

Similarly to the channel, drain channels can be formed in the internal face of the thermal panel, each configured to receive leaked liquid from the closed conduit.

The drain channels can be formed along the panel boundary or along the panel openings to prevent leakage therebeyond.

The method of manufacturing the thermal wall can further comprise steps of:
(i) receiving data indicative of location and dimensions of the one or more panel boundaries of said thermal panel; and
(ii) forming by a machining tool a drain channel at said internal face along said one or more panel boundaries.

Further, the method of manufacturing the thermal wall can comprise steps of:
(i) receiving data indicative of location and dimensions of one or more panel openings to be formed in said thermal panel; and
(ii) forming by a machining tool a drain channel at said internal face around said one or more panel openings.

When drain channels are formed along both the panel boundaries and the panel openings, they define a liquid containing area therebetween, configured to contain leaked liquid from the conduit.

Any one or more of the following features, design and configurations can be applied to a thermal wall, or a method of manufacturing a thermal wall, according to the first and the second aspects, separately or in various combinations thereof:

The panel workpiece and the thermal panel formed therefrom can be made of a solid surface.

The term "solid surface" as used herein the specification and claims, refers to a synthetic/man-made material, for example, a material including one or more of the following: an acrylic polymer, a Methyl methacrylate (MMA), an alumina trihydrate (ATH), a polyester, epoxy, composite materials, and/or any combination thereof. The solid surface material can be characterized by one or more of the following: non-porous, impermeable, low-maintenance, stain resistant, thermoform-able, moisture resistant, heat resistant, easy to clean, anti-bacterial, hard-wearing, highly resistant, easy connectable to one other solid surface materials, and/or any combination thereof.

The thermal panel can be factory-finished. This feature of the thermal panel can allow using it 'as is', e.g., without requiring any further treatment and finishing after leaving the factory, such as applying coating, painting, etc.

The solid-surface can for example refer to one of the following: Corian®, Avonite Surfaces®, HI-MACS®, KRION®, etc.

According to an example, the cover layer is made of the same material as the thermal panel.

The thermal wall can be used as a wall of a room, and optionally a ceiling or a floor of a room.

The closed conduit can be configured to facilitate flow of heated/cooled liquid and thereby facilitate radiation/absorption of heat to/from the building structure at least through the external face of the thermal panel. To avoid radiation/absorption of heat to/from the opposite direction, the cover layer can comprise heat insulating material having heat conductivity lower than a material of which the thermal panel is made. Alternatively, the thermal wall can include further layers beyond the cover layer, with respect to the thermal panel, having heat insulation capabilities.

Particularly, the further layers can include the frame structure, where the cavities thereof can be filled with heat insulating material.

The thermal panel can constitute an outermost layer of the thermal wall configured to face the interior of the room, thereby facilitate low resistant to heat radiation/absorption from the conduit into the interior of the room. Forming the channel in a thickness of the thermal panel, close to the external face thereof, contributes to heat radiation through the external face. Particularly if the thermal panel is made of a material having high heat conductivity such as solid surface, namely Corian®.

The reference location can be the starting location for the operation of the machining tool on the external face of the panel workpiece.

The machining tool can be constituted by a milling cutter, optionally constituting a part of a CNC machine.

The sealing can be performed at least partially by a sealing adhesive.

The sealing should be such which allows liquid to flow in the closed conduit.

The thermal panel can comprise at least one inlet and at least one outlet, each aligned with a respective portion of said channel, so as to facilitate liquid flow to and from said closed conduit, respectively.

Correspondingly, the method of manufacturing the thermal wall can further comprise a step of forming in said panel workpiece at least one inlet and at least one outlet, each configured to be aligned with a respective portion of the channel, so as to facilitate liquid flow to and from said closed conduit, respectively.

The inlet and the outlet can be configured to establish fluid communication between the closed conduit and other components of the hydronic radiant thermal system, e.g., a pump configured to facilitate circulation of liquid within the closed conduit, and a heat exchanger configured to facilitate the heating/cooling of the liquid.

Aside from irregular portions thereof such as inlet or outlet, the channel can be formed in said panel workpiece up to a depth smaller than a thickness of the panel workpiece.

According to a third aspect of the presently disclosed subject matter, there is provided a method of designing a thermal panel having a channel formed therein, configured for use in a thermal wall for use with a hydronic radiant thermal system, said thermal wall having one or more utility openings. The method comprises steps of:

(i) receiving data indicative of location and dimensions of one or more panel boundaries of the thermal panel, corresponding to external boundaries of the thermal wall;

(ii) receiving data indicative of location and dimensions of one or more zonal boundaries of liquid-free zones within the panel boundaries, including zones at which panel openings are to be formed in the thermal panel corresponding to the one or more utility openings of the thermal wall;

(iii) defining an operational area between the panel boundaries and zonal boundaries; and (iv) defining a geometry of liquid flow path at the operational area bypassing the liquid free zones, the liquid flow path having a geometry according to which the channel is to be formed in a panel workpiece to obtain the thermal panel.

The operational area can be a 2D area on the thermal panel, on which the liquid flow path is defined.

The method of designing can further comprise a preliminary step of obtaining an architectural plan of the thermal wall comprising data indicative of location and dimensions of the external boundaries of the thermal wall, as well as one or more utility openings in the thermal wall, according to which the panel openings are formed.

The liquid free zones can be associated with areas of the thermal panel through which it is desired to avoid, or impractical to perform, radiation/absorption of heat. Such areas may be, for example, panel openings to be formed in the thermal panel corresponding to the one or more utility openings of the thermal wall. The utility openings location and dimensions can be determined according to an architectural plan of the thermal wall which can also comprise data indicative of location and dimensions of the external boundaries of the thermal wall.

The one or more liquid free zones can further include areas on the thermal panel through which radiation/absorption of heat is undesired due to considerations related to interior design of the building structure. In other words, the liquid free zones can also refer to usable areas of the thermal panel, through which it is undesired to radiate/absorb heat, e.g., areas designated for mounting wall decorations or wall mounted furniture/devices thereon. According to an example, at least some of the liquid free zones correspond to an internal design plan of the building structure including location and dimensions of certain furniture to be placed in the building structure potentially obstructing radiation/absorption of heat therebeyond, or in proximity thereto.

The liquid flow path can be a 2D path defined on the internal face of the thermal panel. The geometry of the liquid flow path can be adaptive near narrow/complex areas of the internal face, i.e., areas proximal to a panel boundary of the thermal panel, corresponding to an external boundary of the thermal wall, or to a liquid free zone, thereby creating an efficiently distributed radiation/absorption of heat thereal-ong.

According to an example, the liquid flow path is designed with a plurality of sub-paths constituting building blocks of the liquid flow path, branching and converging back to a main stream line, similarly to a flow of a natural river. Each of the sub-paths can have:

at least one inlet flow path;
at least one outlet flow path;
a plurality of distributary paths, optionally extending generally parallel each other;
a branching path in which said at least one inlet flow path branches into the plurality of distributary paths; and
a converging path in which said plurality of said distributary paths converge into said at least one outlet flow path.

According to an example, the inlet flow path and the outlet flow path both constitute a portion of one main stream line, which branches off into the distributary paths through the branching path, and converge back into the main stream line through the converging path.

The liquid flow path can comprise at least three of those sub-paths, where at least two of which are generic sub-paths with predetermined dimensions, and at least one of which is an adaptive sub-path with adaptive dimensions which are different from the predetermined dimensions. Such distribution into types can ease the design work of the thermal panel, i.e., the design work of the liquid flow path, as it allows repetitive use in the generic sub-paths, up to a point where they do not fit within the operational area and where the adaptive sub-path/s can be used to fill up the void. In such a manner, the adaptive sub-path/s can be those bordering the liquid free zones and/or the panel boundaries. In the design process, the step of defining the liquid flow path can include determining a number of generic sub-paths to be applied therein while taking into consideration dimensions of the operational area, and the predetermined dimensions. It can be that the generic sub-paths occupy more of the operational area than the adaptive sub-path/, and/or constitute a majority of the entire liquid flow path.

The operations in accordance with the teachings herein may be performed by a computer specially constructed for the desired purposes or by a general-purpose computer specially configured for the desired purpose by a computer program stored in a non-transitory computer-readable storage medium.

The terms "non-transitory memory" and "non-transitory storage medium" used herein should be expansively construed to cover any volatile or non-volatile computer memory suitable to the presently disclosed subject matter. The computer can be configured to execute several functional modules in accordance with computer-readable instructions implemented on a non-transitory computer, each correspond to a respective step in the method of designing. Such functional modules are referred to hereinafter as comprised in the computer. The computer can comprise a data obtaining module configured to obtain data indicative of location and dimensions of the one or more panel boundaries and of the one or more zonal boundaries. The computer can further comprise a processing module configured to receive data from the data obtaining module indicative of the one or more zonal boundaries location and dimensions and derive therefrom the operational area between the panel boundaries and zonal boundaries.

The computer can further comprise an optimization module configured to determine the geometry of the liquid flow path on the operational area.

Communication between the various components of the computer can be realized by any signaling system or communication components, modules, protocols, software languages and drive signals, and can be wired and/or wireless, as appropriate.

The computer may include fewer, more, modified and/or different modules and functions than those discussed herein. To provide one non-limiting example of this, in some examples the processing module and optimization module can be combined.

It will also be understood that the computer according to the presently disclosed subject matter may be, at least partly, implemented on a suitably programmed computer. Likewise, the presently disclosed subject matter contemplates a computer program being readable by a computer for executing the designing method of the presently disclosed subject matter. The presently disclosed subject matter further contemplates a non-transitory computer-readable memory tangibly embodying a program of instructions executable by the computer for executing the designing method of the presently disclosed subject matter.

The method of designing the thermal panel can be adapted to the manufacturing process thereof, such that limitations related to the manufacturing process are taken into consideration in the design stage. For example, when a manufacturing process dictates that merely smaller articles than the desired thermal panel can be produced, the designing method can further comprise a step of delimiting sub-boundaries within the panel boundaries of the thermal panel to define at least two sub-sections therebetween, each of which containing a respective portion of the liquid flow path.

By implementing such designing method, it is possible to create a distributed liquid flow path throughout the thermal panel, while exploiting its surface area efficiently, especially near liquid free zones and complex boundaries. It should be appreciated that the liquid flow path distribution can be designed while taking in consideration liquid flow characteristics such as pressure losses, temperature losses, etc.

The geometry of the liquid flow path can fully define the geometry of the channel and thereby the close conduit, or to define a general path for forming the channel, not including reference to parameters such as changing width or depth of the channel. These parameters can be defined separately during designing of the wall.

For example, a respective portion of the channel associated with an inlet portion of the liquid flow path can be designed to a wider extent than the rest of the channel, or be shaped, optionally as a circle, to facilitate incorporation of a valve. Such valve can be used to selectively allow fluid communication into the respective channel sub-portion.

According to a fourth aspect of the presently disclosed subject matter, there is provided a thermal construction assembly comprising:
  a thermal panel having an external face configured to be directed into an interior of a building structure and an opposite internal face;
  a heat radiating/absorbing element of a radiant thermal system disposed adjacent the internal face, configured to radiate/absorb heat through said external face into/from the building structure;
  an air convection system comprising an airflow generating device, configured to blow air at least partially along the external face of the thermal panel; and
  a control system comprising a sensor configured to sense a parameter indicative of thermal comfort in the building structure, and a controller operatively connected to the airflow generating device for controlling at least the blowing of air according to value of said parameter, when the heat radiating/absorbing element radiates/absorbs heat through said external face.

The radiating thermal system can be a hydronic radiant thermal system, and the heat radiating/absorbing element can be a closed conduit associated therewith.

According to an example of the presently disclosed subject matter, when the value of the parameter drops below/exceeds a certain threshold value, the operation of the airflow generating device initiates/stops in response accordingly. According to a more particular example, the intensity of operation of the airflow generating device can be controlled.

The building structure herein can refer to a room of a house.

According to an example the airflow generating device blows air along the external face of the thermal panel. This air is configured to add another aspect of heat transfer in the building structure in a cost-effective and efficient way. It should be appreciated that radiant cooling/heating time intervals are relatively long with respect to the needs of humans for obtaining thermal comfort. Such arrangement enables rapid responsivity to changes in the thermal comfort of the room. It should also be appreciated that the blowing of air along the external face rather than directly into the building structure, is configured to improve the thermal comfort in the building structure.

The sensor can be configured to sense temperature or any other parameter/s indicative of the thermal comfort in the room, optionally according to a thermal comfort standard, e.g., ASHRAE 55, ISO 7730. These parameters can include technical parameters such as humidity, air speed, air temperature, mean radiant temperature, or human parameters such as skin temperature, metabolic rate, etc.

According to an example, the control system includes an additional sensor configured to sense at least one parameter indicative of a contemporary flux of heat radiation/absorption through the external face of the thermal panel, thereby determining when the heat radiating/absorbing element radiates/absorbs heat through said external face.

According to an example, the control system is also operatively connected to components of the radiant thermal system configured to influence the radiation/absorb heat through said external face into/from the building structure, thereby determining when the heat radiating/absorbing element radiates/absorbs heat through said external face.

When the radiant thermal system is a hydronic radiant thermal system, such components can include a pump configured to circulate the liquid or a heat exchanger configured to heat/cool the liquid.

The air convection system can comprise an air inlet configured for intaking air from the building structure and an air outlet configured for blowing air therethrough into the building structure. The air flow generating device can be disposed between the air inlet and the air outlet.

The air outlet can be positioned in proximity to the external face, e.g., positioned in a corner between the external face an a face of an additional wall, or extending from the external face itself, to facilitate blowing of air along an air blowing axis extending at least partially along the external face. The air outlet and the air inlet can be positioned within and facing the interior of the building structure. The air blowing axis can form an angle smaller than 90 degrees with the external face, at least at the area in which the heat radiating/absorbing element is disposed.

According to an example, the air blowing axis is angled with respect to the external face at an angle smaller than 45 degrees, yet more particularly smaller than 15 degrees, and even 0 degrees (i.e., parallel to the external face).

The air outlet can define an effective air outlet plain to which said air blowing axis is perpendicular.

According to an example, the air inlet is also configured to face the interior of the building structure for intaking air from the building structure.

According to a fifth aspect of the presently disclosed subject matter, there is provided a non-contact actuation assembly configured to operate a communication line of an infrastructure system through a panel having an external face configured to be directed into an interior of a building structure, and an opposite internal face. The assembly comprises:

an actuator configured to be positioned adjacent the external face by a user during operation; the actuator comprises an actuating member constituted by at least one of a magnetic member and a magnetizable member; and an operator configured to be disposed adjacent the internal face during operation, and control communication at said communication line, said operator comprising an operating member constituted by a matching one of said magnetic member and said magnetizable member;

wherein upon the positioning of the actuator adjacent the external face, in register with the operator, the actuating member and the operating member are configured to be magnetically coupled such that the operator is switchable, upon disposition of said actuator member with respect to said external face, at least between a first state in which communication in the communication line is established and a second state in which communication in the communication line is obstructed.

The infrastructure system can be any common/non-common infrastructure system typically incorporated in a wall such as electricity infrastructure, water infrastructure, and a hydronic/non-hydronic radiant thermal system. The communication line can be correspondingly one of the following: wiring of the electricity infrastructure, piping of the water infrastructure, and a closed conduit of the hydronic radiating thermal system.

According to a particular example, the closed conduit is embedded in the thermal wall according to the above first, second and third aspects.

According to this example, the operator is constituted by a valve disposed in the closed conduit constituting the communication line, configured to allow/obstruct liquid flow within the conduit at particular areas of the thermal wall, so as to control radiating/absorption of heat at these particular areas. The particular areas can be, for example, areas in proximity to which furniture is positioned, or areas which a habitat of the building structure wishing to make useful, for example for mounting wall decorations/images thereon. In addition, these particular areas can be areas at which there is a technical problem with the closed conduit (e.g., leakage of liquid), and they can be at least temporary "turned off" until the technical problem is solved, without malfunctioning the entire liquid flow path of the closed conduit.

The operator can be configured to be positioned along the closed conduit of the thermal panel, and control liquid communication therethrough.

According to an example, the operator can comprise a line portion of the communication line, so that at the first state, the line portion is aligned with the rest of the communication line, and at the second state, the line portion is misaligned with the rest of the communication line, thereby obstructing communication therethrough.

When the operator is constituted by a valve, the line portion can be a conduit/channel portion.

The magnetic member can be for example a ferromagnetic metal such as a common magnet, while the magnetizable member can comprise any metal configured to interact with such magnet, both of which being adapted in size and potential magnetic force, to the thickness of the panel. According to an example, both the actuating member and the operating member are constituted by magnetic members.

The actuating member and the operating member can have corresponding structures, such that upon the positioning of the actuator adjacent the external face, in register with said operator, the actuator automatically acquires a position indicative of the state of the operator.

According to a particular example, the actuator has an elongated shape. This structure of the actuator can provide a user with indication regarding the state of the operator according to the angle at which actuator automatically connects to the external face. For example, a vertical position of the actuator can correspond to a first state of the operator and a horizontal position can correspond to the second state, or vise versa.

The actuator can comprise a housing accommodating the actuating member, optionally allowing rotation of the actuating member with respect thereto. The housing can include a legend configured to indicate according to the positioning/angle of rotation of the actuating member, the state of the operator, when the actuator is positioned adjacent the external face, in register with the operator.

Embodiments

A more specific description is provided in the Detailed Description whilst the following are non-limiting examples of different embodiments of the presently disclosed subject matter. It should be appreciated that Embodiments 1 to 9, correspond to the first aspect of the presently disclosed subject matter; Embodiments 10 to 24, correspond to the second aspect of the presently disclosed subject matter; Embodiments 25 to 36, correspond to the third aspect of the presently disclosed subject matter; Embodiments 37 to 47, correspond to the fourth aspect of the presently disclosed subject matter; and that Embodiments 48 to 57, correspond to the fifth aspect of the presently disclosed subject matter.

1. A thermal wall for use with a hydronic radiant thermal system, said thermal wall having at least one utility opening, and a closed conduit formed in the thermal wall configured to facilitate liquid flow therewithin, formed therein, said thermal wall comprising:

a thermal panel formed with at least one panel opening corresponding in dimensions and location to the utility opening of the thermal wall, having an internal face formed with a channel bypassing said at least one panel opening and an opposite external face configured to be directed into the interior of the building structure; and a cover layer sealingly connected to said internal face of the thermal panel so as to cover at least a portion of said channel, and thereby form the closed conduit, said cover layer having at least one cover opening corresponding in dimensions and location to the utility opening of the thermal wall, positioned in register with said at least one panel opening of said thermal panel, thereby forming said utility opening in said thermal wall.

2. The thermal wall according to Embodiment 1, wherein said thermal panel is made of solid-surface.

3. The thermal wall according to Embodiment 1 or 2, wherein said thermal panel comprises an inlet and an outlet, each aligned with a respective portion of said channel, so as to facilitate liquid flow to and from said closed conduit, respectively.

4. The thermal wall according to any one of Embodiments 1 to 3, wherein said cover layer is sealingly connected to said thermal panel by an adhesive applied therebetween.

5. The thermal wall according to any one of the preceding Embodiments, wherein said thermal panel comprises a plurality of panel sub-pieces connected to each other, each of which formed with a respective sub-portion of said channel.

6. The thermal wall according to Embodiment 5, further comprising a funnel element positioned at a border area between two channel sub-portions facilitating liquid passage therebetween, said funnel element extending from one channel sub-portion into another.

7. The thermal wall according to Embodiment 6, wherein said funnel element has a cross sectional shape corresponding to a cross sectional shape of at least one of said channel sub-portions between which it facilitates liquid passage.

8. The thermal wall according to any one of the preceding Embodiments, wherein said cover layer comprises heat insulating material having heat conductivity lower than a material of which said thermal panel is made.

9. The thermal wall according to any one of the preceding Embodiments, wherein said thermal panel further comprises at least one drain channel at said internal face, extending along at least one of said one or more panel boundaries, and said one or more panel openings.

10. A method of manufacturing a thermal wall for use with a hydronic radiant thermal system, said thermal wall having a closed conduit formed in the thermal wall configured to facilitate liquid flow therewithin, said method comprising steps of:
(i) obtaining a panel workpiece having an external face configured to be directed into an interior of a building structure, and an opposite internal face;
(ii) receiving data indicative of a predetermined geometry of a liquid flow path according to which a channel is to be formed in said panel workpiece;
(iii) receiving data indicative of a reference location on said panel workpiece in which at least a portion of said channel is to be formed;
(iv) forming by a machining tool said channel at said internal face, through said reference location according to said predetermined geometry, so as to obtain a thermal panel with said internal face and said external face;
(v) obtaining a cover layer having corresponding dimensions to said thermal panel; and
(vi) sealingly connecting said cover layer to said internal face of the thermal panel such that at least a portion of said channel is covered, thereby obtaining the thermal wall with said closed conduit, and thereby obtain said thermal wall.

11. The method according to Embodiment 10, wherein said channel is formed in said panel workpiece up to a depth smaller than a thickness of said panel workpiece.

12. The method according to Embodiment 10 or 11, wherein said panel workpiece is at least partially made of solid-surface.

13. The method according to any one of Embodiments 10 to 12, wherein said machining tool is a milling cutter.

14. The method according to any one of Embodiments 10 to 13, further comprising steps of: receiving data indicative of location and dimensions of one or more utility openings to be formed in said thermal wall; and forming corresponding panel openings and cover openings in said thermal panel and in said cover layer, thereby obtaining the utility openings in the thermal wall.

15. The method according to any one of Embodiments 10 to 14, further comprising a step of forming in said panel workpiece an inlet and an outlet, each configured to be aligned with a respective portion of said channel, so as to facilitate liquid flow to and from said closed conduit, respectively.

16. The method according to any one of Embodiments 10 to 15, wherein said sealingly connecting of the cover layer to the thermal panel is performed by applying an adhesive therebetween.

17. The method according to any one of Embodiments 10 to 16, further comprising steps of:
(i) receiving data indicative of location and dimensions of the one or more panel boundaries of said thermal panel; and
(ii) forming by a machining tool a drain channel at said internal face along said one or more panel boundaries.

18. The method according to any one of Embodiments 10 to 17, further comprising steps of:
(i) receiving data indicative of location and dimensions of one or more panel openings to be formed in said thermal panel; and
(ii) forming by a machining tool a drain channel at said internal face around said one or more panel openings.

19. The method according to any one of Embodiments 10 to 18, wherein said panel workpiece comprises a plurality of panel sub-workpieces each of which configured to be formed with a respective portion of said channel, and wherein said step of forming said channel includes forming on each panel sub-workpiece its respective portion of said channel, thereby obtaining a panel sub-piece.

20. The method according to Embodiment 19, further comprising a step of connecting said panel sub-pieces to each other such that their respective portions of the channel are aligned to form said channel.

21. The method according to Embodiment 19 or 20, further comprising a step of positioning a sealing layer at a border area between two of said panel sub-pieces.

22. The method according to Embodiment 21, wherein said sealing layer comprises adhesive.

23. The method according to any one of Embodiments 19 to 22, further comprising a step of connecting a funnel element at said border area facilitating liquid passage between said respective portions of said channel, said funnel element extending from one channel sub-portion into another.

24. The method according to any one of Embodiments 10 to 23, wherein said cover layer comprises heat insulating material having heat conductivity lower than a material of which said thermal panel is made.

25. A method of designing a thermal panel having a channel formed therein, configured for use in a thermal wall for use with a hydronic radiant thermal system, said thermal wall having one or more utility openings, said method comprising steps of:
(i) receiving data indicative of location and dimensions of one or more panel boundaries of said thermal panel, corresponding to external boundaries of the thermal wall;

(ii) receiving data indicative of location and dimensions of one or more zonal boundaries of liquid-free zones within said panel boundaries, including zones at which panel openings are to be formed in said thermal panel corresponding to said one or more utility openings of said thermal wall;

(iii) defining an operational area between said panel boundaries and zonal boundaries; and (iv) defining a geometry of a liquid flow path at said operational area bypassing said liquid free zones, said liquid flow path having a geometry according to which said channel is to be formed in a panel workpiece to obtain said thermal panel.

26. The method according to Embodiment 25, wherein said liquid flow path comprises at least two sub-paths, each of which has:

(i) at least one inlet flow path;
(ii) at least one outlet flow path;
(iii) a plurality of distributary paths;
(iv) a branching path in which said at least one inlet flow path branches into said plurality of distributary paths; and
(v) a converging path in which said plurality of said distributary paths converge into said at least one outlet flow path.

27. The method according to Embodiment 26, wherein said liquid flow path comprises at least three of said sub-paths, at least two of which being of a generic type with predetermined dimensions, and at least one of which being of an adaptive type with adaptive dimensions different from said predetermined dimensions.

28. The method according to Embodiment 27, wherein said at least two sub-paths of the generic type occupy more of said operational area than said at least one sub-path of the adaptive type.

29. The method according to Embodiment 27 or 28, wherein said at least one sub-path of the adaptive type borders at least one of said one or more liquid free zones and/or at least one of said one or more zonal boundaries and/or at least one of said panel boundaries.

30. The method according to any one of Embodiment 27 to Embodiment 29, wherein said step of defining said liquid flow path includes determining a number of sub-paths of the generic type to be applied therein while taking into consideration dimensions of said operational area.

31. The method according to any one of Embodiment 27 to Embodiment 30, wherein said sub-paths of the generic type constitute a majority of said liquid flow path.

32. The method according to any one Embodiment 25 to 31, further comprising a preliminary step of obtaining an architectural plan of said thermal wall comprising data indicative of location and dimensions of said one or more utility openings in said thermal wall, and said one or more external boundaries.

33. The method according to any one of Embodiments 25 to 32, wherein the one or more liquid free zones can further include areas on the thermal panel through which radiation/absorption of heat is undesired due to considerations related to interior design of the building structure.

34. The method according to any one of Embodiments 25 to 33, wherein said distributary paths extend generally parallel each other.

35. The method according to any one of Embodiments 25 to 34, further comprising a step of delimiting sub-boundaries within said panel boundaries to define at least two sub-sections therebetween, each of which containing a respective portion of said liquid flow path.

36. The method according to any one of Embodiments 25 to 35, wherein each of said one or more liquid free zones has a boundary, at least a majority thereof being common with said operational area.

37. A thermal construction assembly comprising:
a thermal panel having an external face configured to be directed into an interior of a building structure and an opposite internal face;
a heat radiating/absorbing element of a radiant thermal system disposed adjacent said internal face, configured to radiate/absorb heat through said external face into/from the building structure;
an air convection system comprising an airflow generating device, configured to blow air at least partially along at least one of said external face and said internal face of said thermal panel; and
a control system comprising a sensor configured to sense a parameter indicative of thermal comfort in said building structure, and a controller operatively connected to the airflow generating device for controlling at least the blowing of air according to value of said parameter, when the heat radiating/absorbing element radiates/absorbs heat through said external face.

38. The thermal construction assembly according to Embodiment 37, wherein said air convection system is configured to blow air at least partially along said external face of said thermal panel.

39. The thermal construction assembly according to Embodiment 37 or 38, wherein said air convection system comprises an air inlet configured to facilitate air intake therethrough along an air taking axis, an air outlet configured to facilitate blowing of air therefrom along an air blowing axis, and wherein said airflow generating device is configured to induce airflow therebetween.

40. The thermal construction assembly according to Embodiment 39, wherein said air outlet is configured to be positioned within said building structure so as to induce airflow within said building structure along said external face.

41. The thermal construction assembly according to Embodiment 40, wherein said air outlet is configured to be positioned proximal to the external face, such that said air blowing axis forms an angle smaller than 90 degrees with respect thereto, particularly, at an angle smaller than 60 deg, more particularly smaller than 45 deg, yet more particularly smaller than 30 deg, and even more particularly, parallel thereto.

42. The thermal construction assembly according Embodiment 40 or 41, wherein said air outlet defines an effective air outlet plain being angled with respect to said external face in an angle smaller than 180 degrees, particularly, at an angle smaller than 145 deg, more particularly smaller than 130 deg, yet more particularly smaller than 100 deg, and even more particularly, perpendicularly thereto.

43. The thermal construction assembly according to any one of Embodiments 39 to 42, wherein said air inlet is configured to be in fluid communication with said interior of said building structure.

44. The thermal construction assembly according to any one of Embodiments 37 to 43, wherein said radiant thermal system is a hydronic radiant thermal system comprising a closed conduit formed in the thermal wall configured to facilitate liquid flow therein, positioned adjacent said internal face.

45. The thermal construction assembly according to Embodiment 44, wherein said closed conduit comprises a channel formed at said internal face.

46. The thermal construction assembly according to any one of Embodiments 37 to 45, wherein the control system further comprises an additional sensor configured to sense a parameter indicative of a contemporary flux of heat radiation/absorption through the external face of the thermal panel.

47. The thermal construction assembly according to any one of Embodiments 37 to 46, wherein the control system is also operatively connected to components of the radiant thermal system configured to influence the radiation/absorb heat through said external face into/from the building structure.

48. A non-contact actuation assembly configured to operate a communication line of an infrastructure system through a panel having an external face configured to be directed into an interior of a building structure, and an opposite internal face, said assembly comprising:
- an actuator configured to be positioned adjacent said external face by a user during operation, said actuator comprising an actuating member constituted by at least one of a magnetic member and a magnetizable member; and
- an operator configured to be disposed adjacent said internal face during operation, and control communication at said communication line, said operator comprising an operating member constituted by a matching one of said magnetic member and said magnetizable member;
- wherein upon said positioning of said actuator adjacent said external face, in register with said operator, said actuating member and said operating member are configured to be magnetically coupled such that said operator is switchable, upon disposition of said actuator member with respect to said external face, at least between a first state in which communication in said communication line is established and a second state in which communication in said communication line is obstructed.

49. The non-contact actuation assembly according to Embodiment 48, the operator can comprise a line portion of the communication line, so that at the first state, the line portion is aligned with the rest of the communication line, and at the second state, the line portion is misaligned with the rest of the communication line, thereby obstructing communication therethrough.

50. The non-contact actuation assembly according to Embodiment 47, wherein said communication line is a fluid communication line.

51. The non-contact actuation assembly according to Embodiment 50, wherein said fluid is liquid.

52. The non-contact actuation assembly according to Embodiment 51, wherein said operator comprises a conduit portion configured to constitute a part of the liquid communication line at least at said first state of said operator.

53. The non-contact actuation assembly according to any one of Embodiments 47 to 52, wherein both of said actuating member and said operating member are constituted by magnetic members.

54. The non-contact actuation assembly according to Embodiment 53, wherein said actuating member and said operating member have corresponding structures, such that upon said positioning of said actuator adjacent said external face, in register with said operator, said actuating member automatically acquires a position indicative of the state of said operating member.

55. The non-contact actuation assembly according to Embodiment 54, wherein said actuator comprises a housing accommodating said actuating member, allowing rotation thereof with respect thereto.

56. The non-contact actuation assembly according to any one of Embodiments 47 to 55 wherein said actuating member is elongated.

57. The non-contact actuation assembly according to Embodiment 56, wherein said housing comprises a legend configured to assist a user in indicating the state of the operator.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1B illustrates a perspective exploded view of the thermal wall of FIG. 1A;

FIG. 1C illustrates an opposite view of the perspective view of FIG. 1B;

FIGS. 6A and 6B illustrates a thermal construction assembly including the thermal wall of FIG. 1A with a portion of the closed conduit shown for illustration purposes, an air convection system, and a control system.

DETAILED DESCRIPTION

Figure 1A:
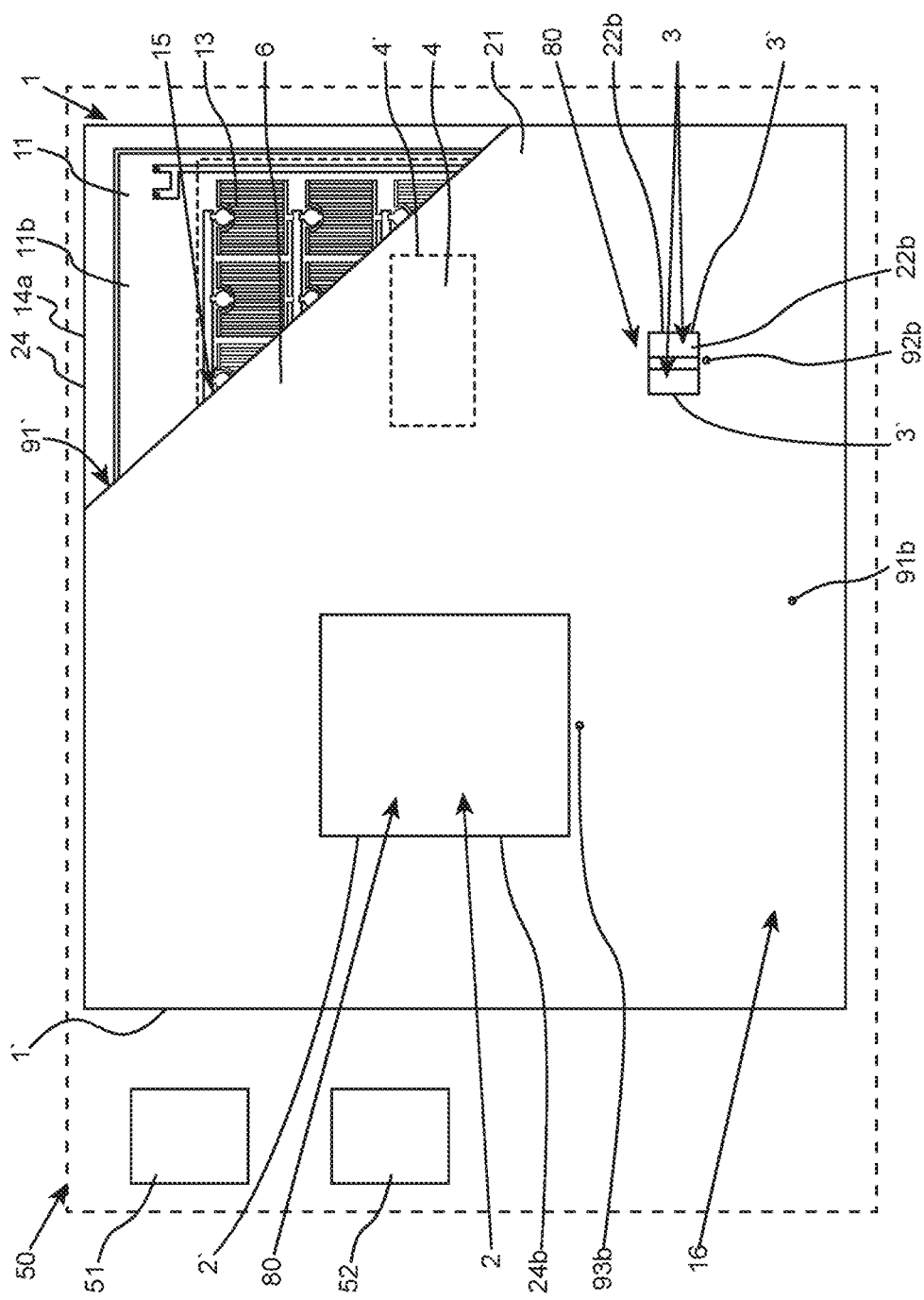
FIG. 1A illustrates a rear view of a thermal wall according to one example of the presently disclosed subject matter, where a cover layer of the wall is partially removed for illustration purposes.

It is appreciated that, unless specifically stated otherwise, certain features of the presently disclosed subject matter, which are described in the context of separate examples, can also be provided in combination in a single example. Conversely, various features of the presently disclosed subject matter, which are described in the context of single example, can also be provided separately or in any suitable sub-combination. In the following detailed description, numerous specific details are set forth in order to provide a thorough understanding of the methods and systems.

Attention is directed to FIGS. 1A to 1E of the present disclosure, illustrating a hydronic radiant thermal system 50 having a thermal wall 1 according to one example related to the first, second and third aspects of the presently disclosed subject matter. The thermal wall 1 is configured to be used as a vertical wall for radiating/absorbing heat to/from a building structure, e.g., a room.

The hydronic radiant thermal system 50 is configured to heat/cool liquid, e.g., water, and circulate it through the thermal wall 1. In turn, the heated/cooled water is configured to exchange heat with their surroundings, particularly, to radiate/absorb heat through the thermal wall 1 to/from an interior of the room.

To facilitate water circulation, the thermal wall 1 is embedded with a shaped closed conduit 15 extending throughout its length and breadth, adapting its shape near narrow/complex areas, thereby creating an efficiently distributed radiation/absorption of heat along the thermal wall 1.

The thermal wall 1 consists of two layers—a thermal panel 11 and a cover layer 21, confining therebetween the closed conduit 15.

The thermal panel 11 constitutes an outermost layer of the thermal wall 1 and comprises an external face 11a, configured to face the interior of the room, and an opposite internal face 11b (best seen in FIG. 1D) configured to face the cover layer 21.

The external face 11a of the thermal panel 11 is smooth so they could be incorporated ecstatically among other interior facing surfaces of the room, while the internal face 11b is formed with a shaped channel 13. The cover layer 21 is sealingly connected to the internal face 11b, so as to cover the channel 13 and thereby form the closed conduit 15.

To facilitate efficient radiation/absorption of heat to/from the heated/cooled water through the external face 11a of the thermal panel 11, the channel 13 is formed as a groove on the internal face 11b of the thermal panel 11 (best seen in FIG. 1E), particularly up to half the depth of the thermal panel 11. Such arrangement brings the heat radiating/absorbing medium, i.e., the water, close to the interior of the room, thereby contributing to low resistant to heat transfer therebetween, while keeping the outermost surface 11a of the thermal wall 1 facing the interior of the room, i.e., the external face 11a of the thermal panel 11, smooth. Such arrangement can also allow maintaining some of the abilities of the thermal panel 11 as a wall structure, e.g., weight bearing capabilities, moment of inertia, etc.

It should be appreciated that the channel 13 is formed according to a predetermined geometry of a liquid flow path 18.

The predetermined geometry is defined for bypassing liquid free zones 80 of the thermal panel 11, i.e., for passing around or along them, without crossing.

The liquid free zones 80 are associated with areas of the thermal panel 11 through which it is desired to avoid, or impractical to perform, radiation/absorption of heat. Such areas may be, for example, panel openings 12a, 12b, 12c formed in the thermal panel 11 corresponding to utility openings, i.e., window opening 2 and utility socket openings 3, of the thermal wall 1.

The window opening 2 can be used to accommodate a window of the thermal wall 1, while the utility socket openings 3 can be used for accommodating utility sockets, e.g., electricity sockets, vacuum sockets, etc., usable from the interior of the room.

The utility openings 2,3 location and dimensions can be determined according to an architectural plan of the thermal wall 1 which can also comprise data indicative of location and dimensions of external boundaries 1' of the thermal wall 1.

The liquid free zones 80 further include areas on the thermal panel 11 through which radiation/absorption of heat is undesired due to considerations related to interior design of the building structure, i.e., smooth zone 9 of the thermal panel 11 corresponding to a radiation free zone 4 of the thermal wall 1.

At the radiation free zone 4, it is undesired to radiate/absorb heat, e.g., for purposes of mounting wall decorations or wall mounted furniture/devices thereon. The radiation free zone 4 can correspond to an interior design plan of the room detailing location and dimensions of certain furniture in the room potentially obstructing absorption/radiation of heat therebeyond, or in proximity thereto.

To facilitate the circulation and heating/cooling of the water through the closed conduit 15, the hydronic radiant thermal system 50 comprises a pump 51 and a heat exchanger 52, respectively.

In order to facilitate liquid communication between these components (or any other components for that matter) and the conduit 15, the thermal panel 11 is formed with two inlets and two outlets in the form of through holes 15a, and 15b, respectively, positioned facilitating water flow to and from, the closed conduit 15, respectively, each aligned with a respective portion of the channel 13.

The through holes 15a, and 15b, corresponding to the inlets and the outlets herein are positioned at high locations on the thermal panel 11 configured to be hidden from the interior of the room by a ceiling thereof (not illustrated), optionally a drop ceiling (not illustrated) capable of concealing it as well as other utility elements of the room.

As can be seen in the figures, the thermal panel 11 and the cover layer 21 share corresponding dimensions defining external and internal boundaries for the thermal wall 1.

Particularly, the thermal panel 11 comprises the three panel openings 12a, 12b, and 12c, with edges 12a',12b' and 12c' constituting internal boundaries for the thermal panel 11, while the cover layer 21 comprises two corresponding cover openings 22a, 22b. The channel 13 extends along the edge 12a' bypassing the panel opening 12a from four sides thereof, and along a majority, i.e., three sides of each of the edges 12b' and 12c' of the panel openings 12b and 12c. When the thermal panel 11 is positioned adjacent the cover layer 21 in alignment, as seen in FIG. 1A, the panel openings 12a, 12b, and 12c, form together with the cover openings 22a and 22b, three utility openings in the thermal wall 1. Particularly, the panel opening 12a and the cover opening 22a form together window opening 2 in the thermal wall 1, while the panel openings 12b and 12c form together with the cover opening 22b two utility socket openings 3 in the thermal wall 1.

Further, edge 11' constitutes a panel boundary for the thermal panel 11, and edge 21' of the cover layer 21, respectively, define together external edges 1' for the thermal wall 1.

To facilitate liquid flow within the closed conduit 15, the connection between the thermal panel 11 and the cover layer 21 is a sealed connection, performed by a sealing adhesive (not illustrated) applied therebetween.

Nevertheless, to handle any accidental leaks from the closed conduit 15, and to enhance reliability of the hydronic radiant thermal system, the thermal wall 1 further includes three draining arrangements configured to direct leaked water through the cover layer 21, thereby preventing water leakage beyond the boundaries of the thermal wall 1.

Each liquid draining arrangement comprises a drain conduit and a utility outlet passing through the cover layer 21.

To form the drain conduits the internal face 11b of the thermal panel 11 are formed with three drain channels 91a, 92a and 93a, so that when the cover layer 21 is positioned adjacent the internal face 11b it covers the drain channels 91a, 92a and 93a, and thereby forms the drain conduits.

The utility outlets herein are constituted by through holes 91b, 92b and 93b in the cover layer 21, to which a pipe can be sealingly connected to receive the drained water from the drain conduits, and convey them elsewhere, optionally to a sewage system of the house.

As can be seen, the drain channel 91a passes along the panel boundaries 11', i.e., the edges 1' of the thermal wall 1, while the drain channel 92a passes around the panel opening 12a, i.e., around the window opening 2, and the drain channel 93a passes around both the panel openings 12b and 12c, i.e., along the utility socket openings 3, each designed to direct leaked liquid into its respective utility outlet, i.e., its respective through hole 91b, 92b, and 93b, e.g., by gravity, before it passes a respective boundary.

To further facilitate efficient radiation/absorption of heat to/from the heated/cooled water through the thermal panel 11, the thermal panel 11 is made of a material having relatively high heat conductivity, e.g., solid surface, and particularly Corian®.

To avoid radiation/absorption of heat to/from the opposite direction to the external face, i.e., outside the room, it should be appreciated that the cover layer 21 can comprise, or even be completely made of, heat insulating material having heat conductivity lower than the material of which the thermal panel 11 is made, i.e., lower than that of Corian®. Alternatively, the cover layer 21 can be made of the same material as the thermal panel 11, yet be thicker to induce greater resistant to heat conduction. Yet further alternatively, the thermal wall 1 can include further layers positioned beyond the cover layer 21 with respect to the thermal panel 11, one of which can be an insulating layer having low heat conductivity characteristics such as those described above.

It should be appreciated that the thermal panel 11 with the channel 13, is formed in accordance with a predetermined design, in accordance with an architectural plan of the thermal wall 1 comprising data indicative of location and dimensions of the external boundaries thereof, i.e., edges 1', to determine the location and dimensions of the panel boundaries 11', as well as those of the utility openings 2, and 3 in the thermal wall 1, and the radiation free zone 4 on the thermal wall, to determine the location and dimensions of the panel openings 12a, and 12b, and the smooth zone 9, respectively, i.e., to determine the liquid free zones 80 on the thermal panel 11.

The design takes should also take in consideration the dry area 4. One product of the design is the liquid flow path 18, seen in FIG. 1E in dashed lines as a 2 dimensional path on the internal face 11b of the thermal panel 11, according to which the channel 13 is to be formed as a groove on the internal face 11b of the thermal panel 11.

The geometry of the liquid flow path 18, i.e., the shape of the channel 13 herein is adaptive near narrow/complex areas of the internal face 11b of the thermal panel 11, thereby creating an efficiently distributed radiation/absorption of heat therealong.

To facilitate easy implementation of the design, the thermal panel 11 can be made of an easy to process material, e.g., Conan®, and the channel 13 can be cut, optionally by a milling cutter of a CNC machine therefrom in accordance with the geometry of the liquid flow path 18.

Forming of the channel 13 by cutting allows a designer of the liquid flow path 18, i.e., a designer of the thermal panel 11, to neglect limitations concerning bending angles, thickness, and available area between boundaries, leaving its main consideration to be an efficient distribution of the liquid flow path 18.

Figure 2:
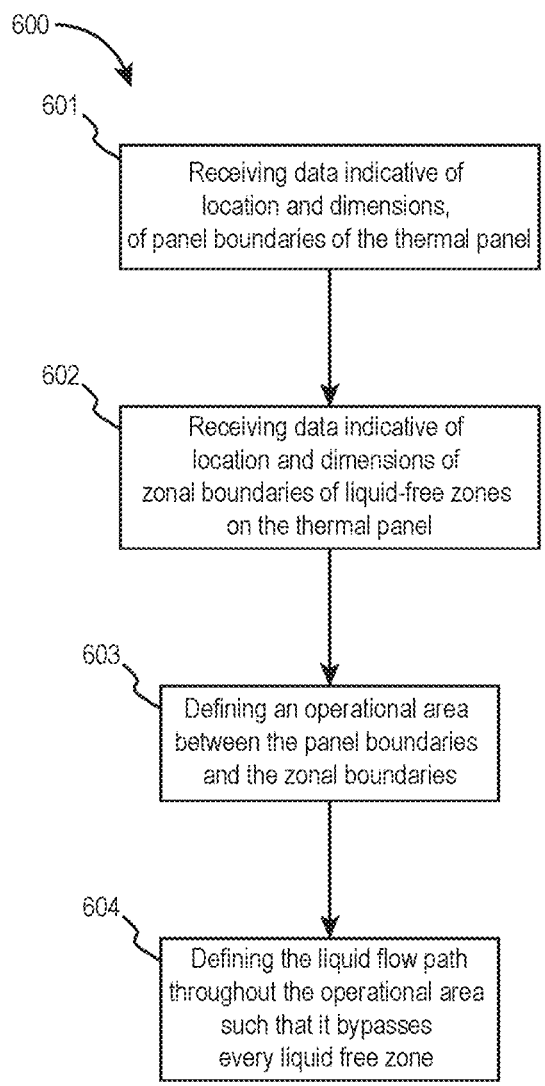
FIG. 2 illustrates a block diagram corresponding to a method of designing the thermal panel seen in FIG. 1D.

Reference is now made to FIG. 2, illustrating a method 600 of designing the thermal panel 11 which includes the following steps:

(i) receiving, in step 601, data indicative of location, e.g., in terms of (X,Y) coordinates, and dimensions, of panel boundaries of the thermal panel 11, i.e., edges 11' corresponding to the external boundaries of the thermal wall 1, i.e., the edges 1';

(ii) receiving, in step 602, data indicative of location, e.g., in terms of (X,Y) coordinates, and dimensions, of zonal boundaries of the liquid-free zones 80 on the thermal panel 11, i.e., edges 12a', 12b' and 12c' and the boundaries of the smooth zone 9, corresponding to internal boundaries of the thermal wall 1, i.e., edges 2', 3' and boundary 4' of the radiation free zone 4, respectively;

(iii) defining, in step 603, an operational area 16 between the panel boundaries of the thermal panel 11 and the zonal boundaries of the liquid free zones 80, excluding the liquid free zones 80, i.e., such that the operational area 16 borders every side thereof; and (iv) defining, in step 604, the liquid flow path 18 distributed throughout the length and breadth of the operational area 16 such that it bypasses every liquid free zone 80.

The step of defining the liquid flow path 18, can be implemented by an algorithm, optionally an optimization algorithm which efficiently maximizes the area at which the liquid flow path 18 extends throughout the operational area 16, while taking into consideration boundaries thereof, i.e., the boundaries of the liquid free zones 80 and the panel boundaries, i.e., edges 11'.

It should be appreciated that the design of the liquid flow path 18 can also take into consideration liquid flow characteristics such as pressure losses, temperature losses, etc.

The designing method can further include a step of defining locations and dimensions for the through holes 15a, and 15b, and for the drain channels 91a, 92a, and 93a, on the thermal panel 11

Figure 1D:
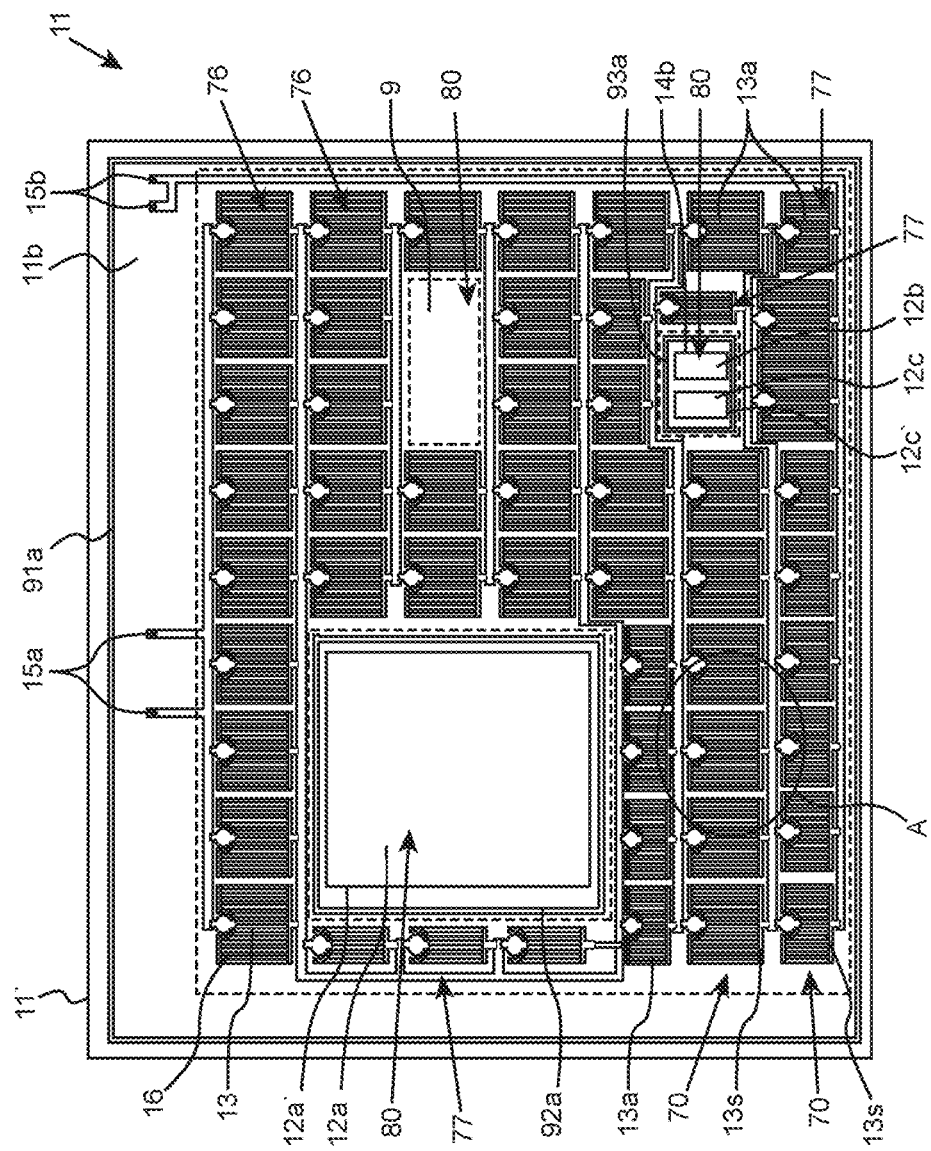
FIG. 1D illustrates a front view of a thermal panel of the thermal wall of FIG. 1A.
Figure 1E:
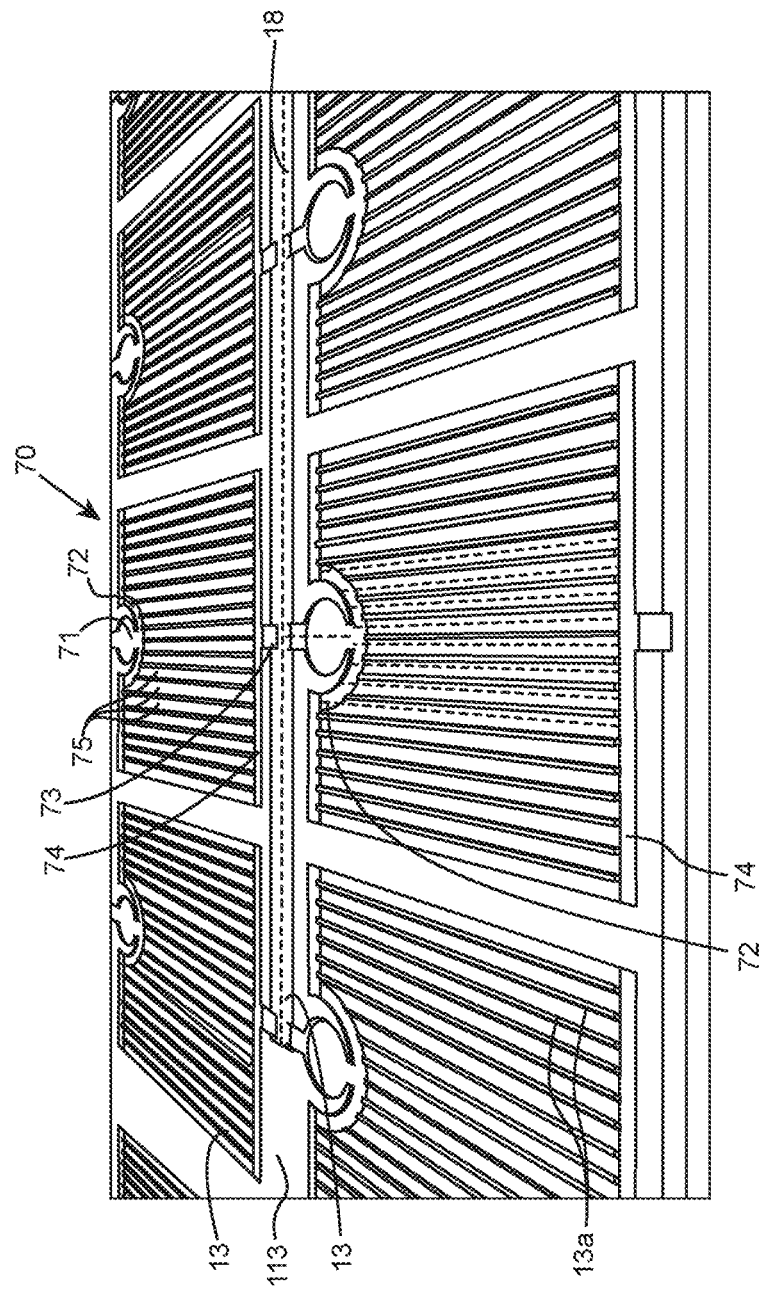
FIG. 1E illustrates a close up perspective view of area A in FIG. 1D, including a channel sub-portion.

As can be understood from the shape of the channel 13 in FIG. 1D, the liquid flow path 18 is distributed throughout the length and breadth of the internal face 11b of the thermal panel 11, adapting its shape near narrow/complex areas, i.e., those areas which are close to an edge of the thermal panel 11 and/or to one of the liquid free zones 80.

It can be seen that the liquid flow path 18 comprises a plurality of building blocks, i.e., a plurality of sub-paths 70 branching and converging back to a main stream line, similarly to a flow of a natural river.

each of the sub-paths includes:
an inlet flow path 71;
an outlet flow path 73;
a plurality of distributary paths 75 extending generally parallel each other;
a branching path 72 in which the inlet flow path 71 branches into the plurality of distributary paths 75; and
a converging path 74 in which the plurality of distributary paths 75 converge back into the outlet flow path 73.

The use of sub-paths allows distribution of the water flowing in the conduit 15, into thin streams, increasing the water surface area through which the heat radiation/absorption is performed.

The sub-paths herein are divided into two types—generic sub-paths 76 with predetermined dimensions, and adaptive sub-paths 77 with changing/adaptive dimensions, different from the predetermined dimensions.

Such distribution into types can ease the design work of the thermal panel 11, as it allows repetitive use in the generic sub-paths 76, up to a point where they do not fit within the operational area 16, and where the use in the adaptive sub-paths 77 can take place to fill up the void. Typically, adaptive sub-paths 77 are used adjacent the liquid free zones 80 and/or adjacent the external boundaries 1' of the thermal wall 1.

In the design method of the liquid flow path 18, the step of defining the liquid flow path 18 can include determining a number of generic sub-paths 76 to be applied, while taking into consideration dimensions of the operational area 16.

To obtain the thermal wall 1, a manufacturer should obtain the thermal panel 11, obtain the cover layer 21 having corresponding dimensions, and sealingly connect the cover layer 21 to the internal face 11b of the thermal panel 11.

Figure 3:
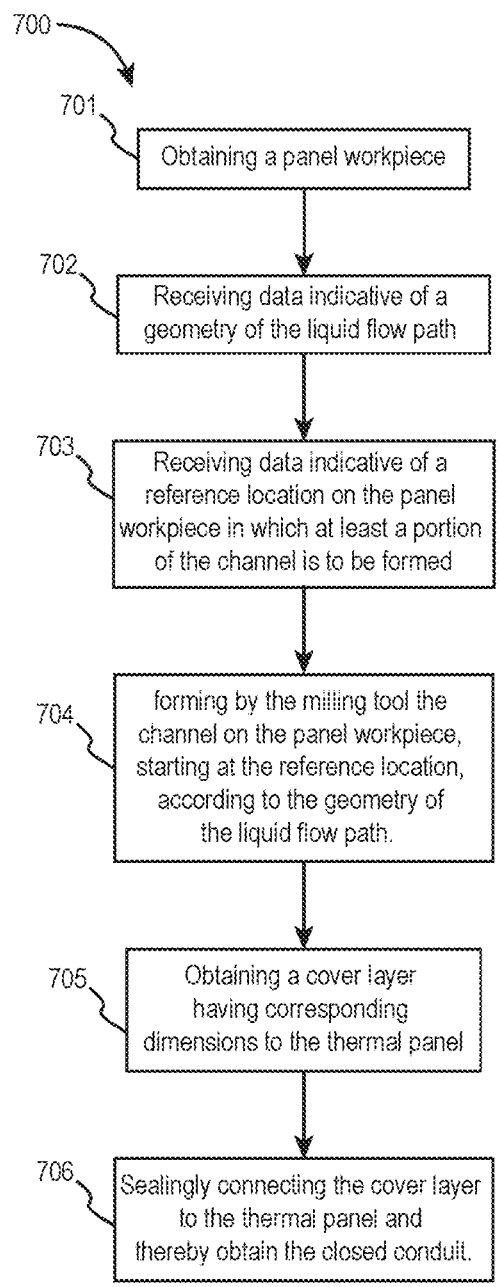
FIG. 3 illustrates a block diagram corresponding to a method of manufacturing the thermal wall of FIG. 1A.

Reference is now made to FIG. 3, illustrating a method 700 of manufacturing the thermal wall 1 which includes the following steps:

(i) obtaining, in step 701, a panel workpiece, having an external face and an opposite internal face corresponding to those of the thermal panel 11, the panel workpiece being preformed with edges 11', 12a', 12b', and 12c' corresponding to the external and internal boundaries of the thermal wall 1;

(ii) receiving, in step 702, data indicative of a geometry of the liquid flow path 18 e.g., length of respective portions, angles therebetween, etc., optionally as defined by the design method hereinabove; it should be appreciated that this data can further include data indicative of width and depth of the channel 13;

(iii) receiving, in step 703, data indicative of a reference location on the internal face of the panel workpiece, e.g., in terms of (X,Y) coordinates on the surface of the panel workpiece, in which at least a portion of the channel 13 is to be formed, i.e., a starting location for the operation of the milling tool; and (iv) forming, in step 704, by the milling tool the channel 13 on the internal face, starting at the reference location, according to the geometry of the liquid flow path 18.

(v) obtaining, in step 705, a cover layer having corresponding dimensions, i.e, edges 21', 22a', and 22b' to the thermal panel; and (vi) sealingly connecting, in step 706, the cover layer 21 to the thermal panel 11, as described, to cover the channel 13, and thereby obtain the closed conduit 15.

It should be appreciated that the method of designing the thermal wall 1 can be adapted to the manufacturing process thereof, such that limitations related to the manufacturing process are taken into consideration during design.

For example, when a manufacturing site is limited in its ability to manufacture articles as large as the thermal panel 11, the designing method of the thermal panel 11 can further comprise a step of delimiting sub-boundaries within the panel boundaries of the thermal panel 11, to define sub-sections therebetween. Each sub section containing a respective portion of the liquid flow path 18, i.e., a respective portion of the channel 13.

In that case the panel workpiece can be consisted of a plurality of panel sub-workpieces, each of which configured to be formed with a respective portion of the channel 13 corresponding to the respective portion of the liquid flow path 18.

Figure 4A:
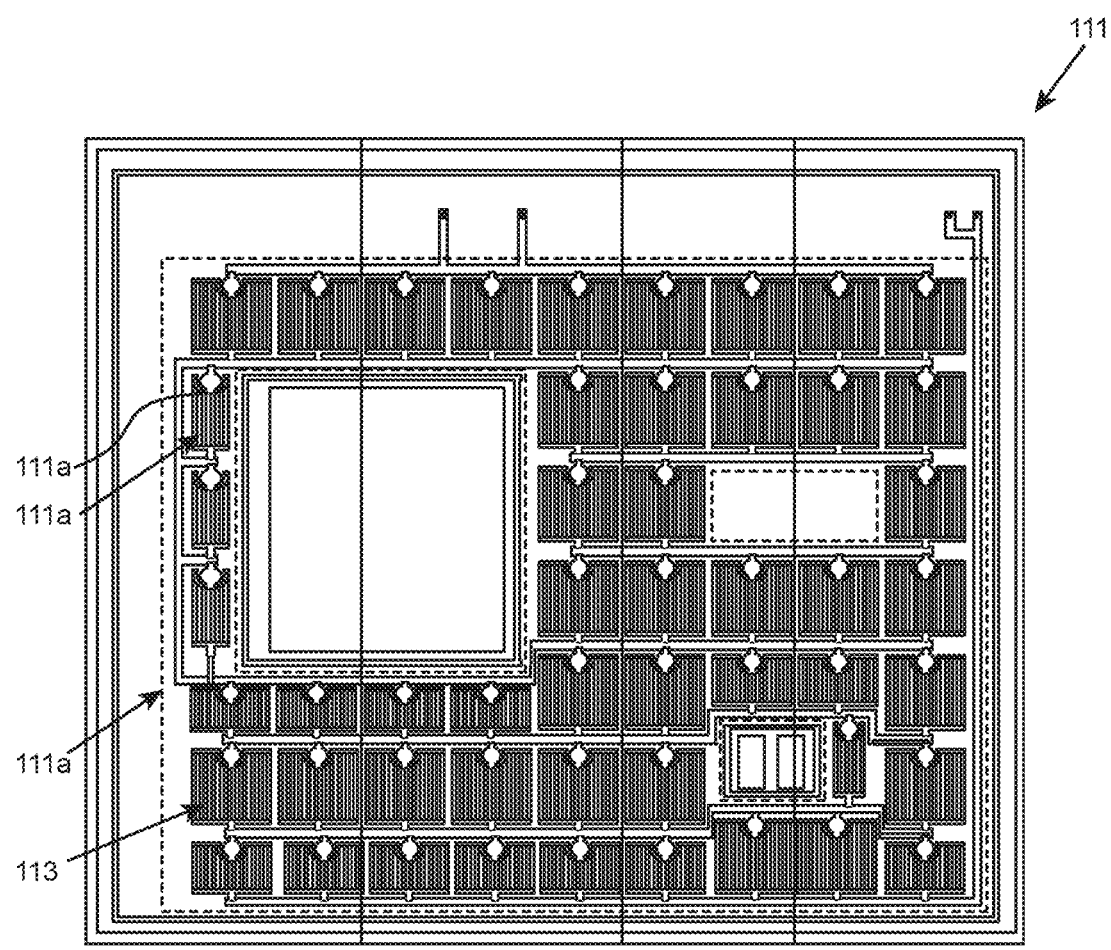
FIG. 4A illustrates a front view of another example of a thermal panel, consists of panel sub-pieces.

FIG. 4A illustrates a thermal panel 111 identical to the thermal panel 11 yet comprises panel sub-pieces 111a, divided according to pre delimited sub-boundaries 111b, corresponding to size limitations of a CNC machine used to manufacture to thermal panel 111. Each panel sub-piece 111a is formed with a respective sub-portion 113a of a channel 113, identical to the channel 13, and if necessary, with a respective portion of a drain channel 91a, 92a, 93a.

In such a case, the method of manufacturing the thermal panel 111 can be similar to the method of manufacturing the thermal panel 11, yet refer to each panel sub-piece 111a as an entire thermal panel 11, with its panel sub-portion 113a constituting the channel 13. The method of manufacturing thermal panel 111 can further comprise a step of connecting the panel sub-pieces 111a to each other such that their respective sub-portions 113a of the channel are aligned, to form the channel 113 continuously.

To facilitate sealing at border areas between two panel sub-pieces 111a, the manufacturing method of the thermal panel 111 can further include a step of applying a sealing layer (not illustrated), e.g., a sealing adhesive, at that border area.

As seen in FIG. 4A, the delimitation of the sub-boundaries 111b can be such that each of which crosses the channel 13, and optionally the drain channels 91a, 92a, and 93a, perpendicularly, thereby further assist in achieving a sealed border area between two panel sub-pieces 111a.

Figure 4B:
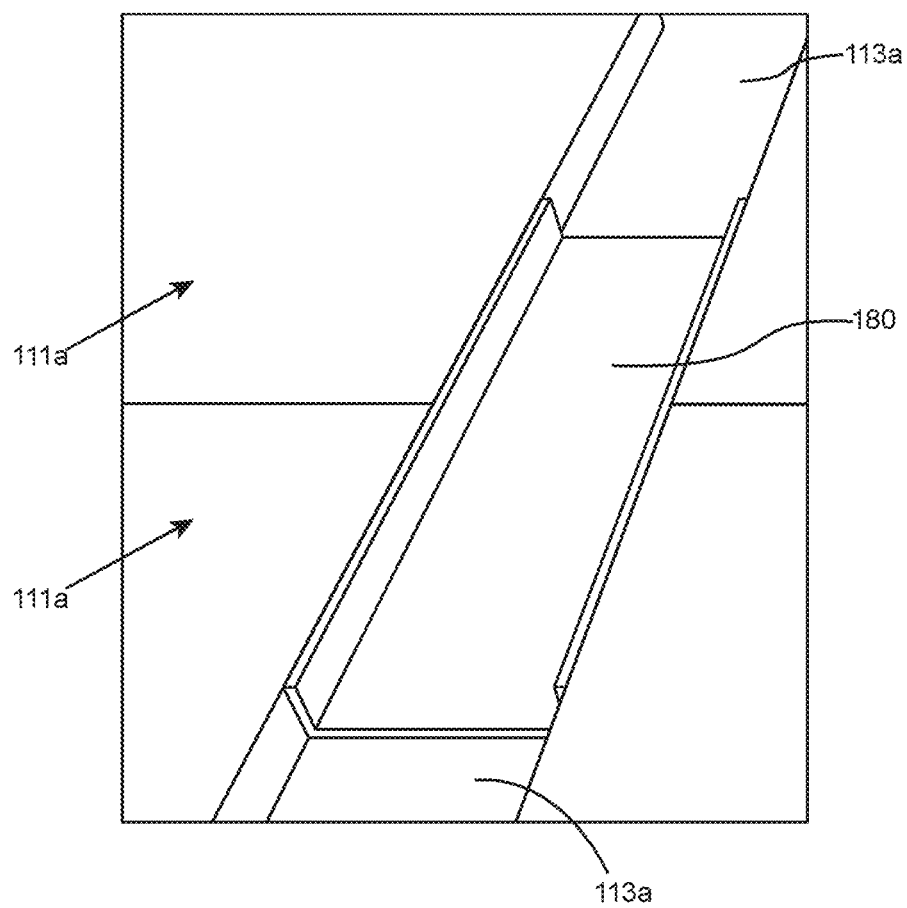
FIG. 4B illustrates a funnel element for use with a thermal panel of FIG. 2A.

In addition to the sealing layer, a funnel element 180, seen in FIG. 4B, can be connected at those border areas to facilitate liquid passage between the respective sub-portions 113a of the channel. The funnel element 180 herein corresponds to the delimitation of the sub-boundaries 111b, in a manner that it is in the form of a rigid half-rectangle, having a cross sectional shape corresponding to the cross sectional shape of the channel sub-portion 113a, which extends out from one channel sub-portion 113a into a respective other.

It should be appreciated that in some cases, it is desired to turn "wet" areas of the thermal wall 1 where the conduit 15 passes into "dry" areas, functioning as radiation free zones similarly to the area 4, even temporarily.

These dry areas can be, for example, areas in proximity to which furniture is positioned, or areas which a habitat of the building structure wishing to make useful, for example for mounting wall decorations/images thereon. In addition, these particular areas can be areas at which there is a technical problem with the closed conduit (e.g., leakage of liquid), and they can be at least temporary "turned off" until the technical problem is solved, without malfunctioning the entire liquid flow path of the closed conduit.

Figure 5A:
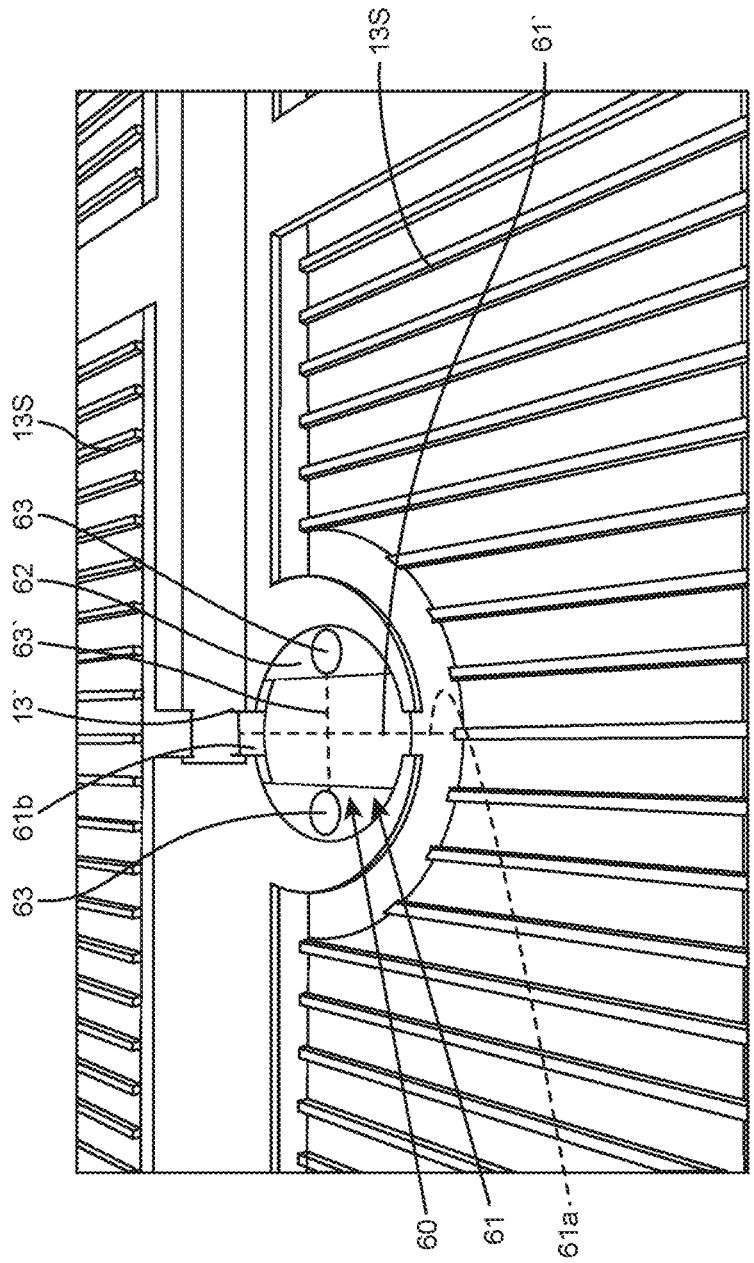
FIG. 5A illustrates a perspective view of a valve incorporated in a channel sub-portion identical to the channel sub-portion seen in FIG. 1E, in a flow allowing state.
Figure 5B:
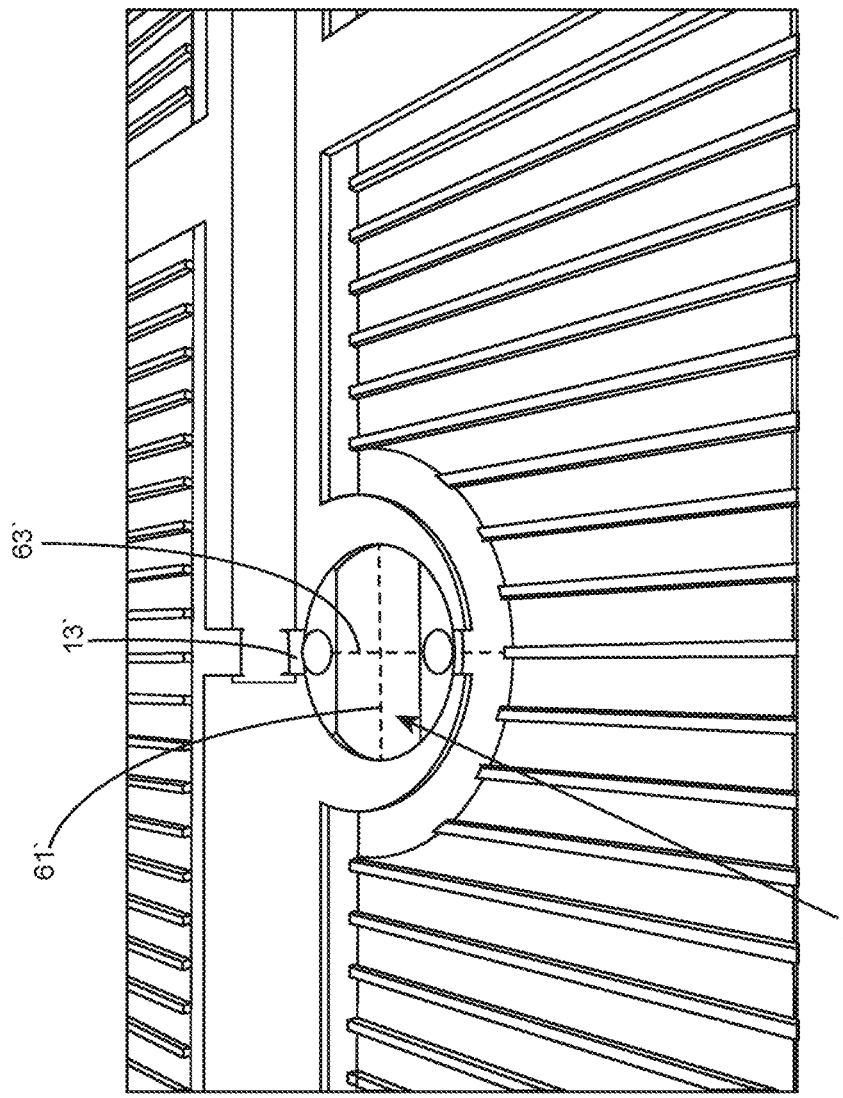
FIG. 5B illustrates the valve of FIG. 5A in a flow obstructing state.
Figure 5C:
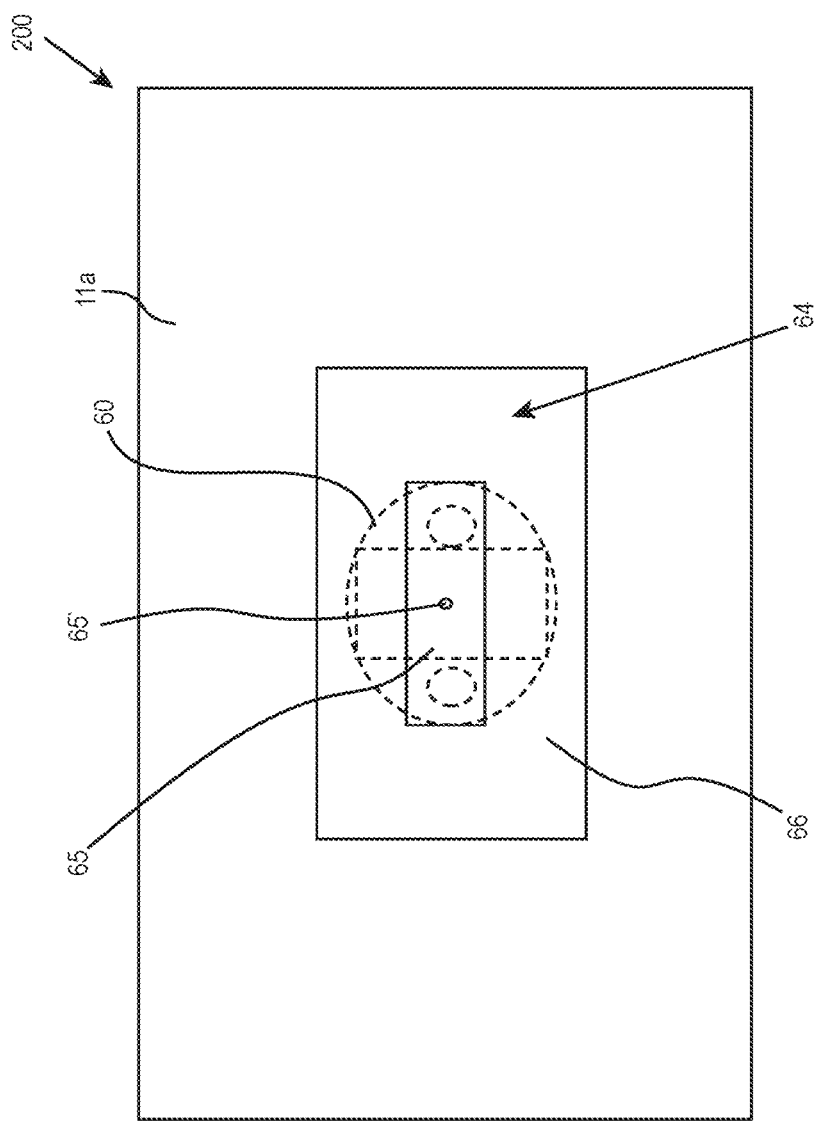
FIG. 5C illustrates a front view of a non-contact actuation assembly where the valve seen in FIG. 5A constitutes an operator, and is seen herein in dashed lines.

For that purpose in every inlet portion 13' of the channel 13 corresponding to a respective inlet flow path 71, a valve 60 can be incorporated, best seen in FIGS. 5A to 5C so that fluid communication between sub-path portions 13S of the channel 13 corresponding to the sub-paths 70, can be selectively established/cut, thereby allowing each of these sub-path portions 13S to be dried out.

The valve 60 is seen herein as a round disk 62 having a utility channel 61 formed therein with two openings 61a and 61b on two opposite sides thereof. The round disk 62 is configured to rotate on its axis between a first state and a second state, i.e., a state of alignment, seen in FIG. 5A, and misalignment, seen in FIG. 5B, of the utility channel 61 with the respective inlet portion 13' of the channel 13 on which the valve is positioned. It should be appreciated in the state of alignment, water flow through the inlet portion 13' is facilitated, while in the state of misalignment, water flow through the inlet portion 13' is obstructed.

To maintain a smooth outermost face for the thermal wall, i.e., smooth external face 11a for the thermal panel, and still be able to operate the valve 60 from the interior of the room, the valve 60 constitutes an operator in a non-contact actuation assembly 200, configured to operate a communication line, i.e., the conduit 15, of an infrastructure system, i.e., the hydronic radiant thermal system 50, through the thermal panel 11.

Particularly, the non-contact actuation assembly is configured to allow non-contact operation of the operator, i.e., rotation of the valve 60, by a designated actuator 64 through the thermal panel 11.

According to the utility channel 61 constitutes a line portion in the communication line, i.e., the closed conduit 15.

The non-contact actuation assembly 200 herein is a magnetic actuation assembly configured to utilize magnetic forces to facilitate such operation.

For that purpose, the valve 60 comprises two magnetic elements, i.e., magnets 63, constituting together an operating member of the operator, fixed on either side of the utility channel 61 within the disk 62, while the actuator 64 herein comprises an elongated magnet 65, constituting an actuating member of the actuator 64. The intensity of the magnets 63,65, i.e., their size, is selected such that upon positioning of the magnet 65 adjacent the external face 11a of the thermal panel 11 such that the magnet 65 is positioned in register with the two magnets 63 of the valve 60, magnetic coupling is formed between the elongated magnet 65 and the two magnets 63, such that disposition, i.e., rotation of the elongated magnet 65 induces rotation of the round disk 62, thereby switching the state of the valve 60 between the first state in which fluid communication in the closed conduit 15 is established and the second state in which fluid communication in the closed conduit 15 is obstructed.

It should be appreciated that the actuator 64 can also "sense" and indicate the state of the valve 60.

For that purpose, the actuator 64 herein further comprises a housing 66 accommodating the elongated magnet 65, in a manner which allows free rotation of the elongated magnet 65 with respect thereto about a hinge 65'. With such configuration, upon the positioning of the actuator 64 against the external face 11a of the thermal panel 11, in register with the valve 60, the elongated magnet 65 is automatically brought into alignment with the two magnets 63.

Particularly, the magnets 63 are positioned such that an imaginary communicating line 63' therebetween forms a 90 degrees angle with a center line 61' of the utility conduit 61, so that upon such positioning of the actuator 64 against the external face 11a in register with the valve 60, the elongated magnet 65 comes to alignment with the imaginary communicating line 63', thereby indicating the state of the utility conduit 61, i.e., vertical, horizontal. This state can be compared to a known orientation of the inlet portion 13', in this case vertical, so as to indicate whether the utility conduit 61 is at a flow enabling/flow obstructing state of the valve 60.

A vertical position of the magnet 65 corresponds to the first state of the valve 60 while horizontal position of the magnet 65 corresponds to the second state of the valve 60.

The housing 66 can further include a legend (not illustrated) configured to assist a user in indicating the state of the valve 60, according to the angle of rotation of the magnet 65 with respect to the housing 66.

It should be appreciated that the performance of the hydronic radiant thermal system 50, or any other radiant thermal system, e.g., the distribution of heat on the thermal panel 11, or the speed and intensity of the heat being conveyed from the thermal panel 11 into the interior of the room, can be improved by operating the hydronic radiant thermal system in conjunction with an air convection system.

The operation of the air convection system can in be performed in conjunction with the hydronic radiant thermal system 50, optionally by a control system, according to predetermined principles.

FIGS. 6A and 6B illustrate a thermal construction assembly 400 comprising an air convection system 300, a control system 310, and the hydronic radiant thermal system 50, particularly, the thermal wall 1 with its thermal panel 11 and a heat radiating/absorbing element in the form of closed conduit 15 disposed adjacent the internal face 11b of the thermal panel, configured to radiate/absorb heat through said external face into/from the building structure.

The thermal construction assembly 400 can be stationed in areas in need of boosted cooling/heating power, such as living room with windows.

The air convection system 300 is configured to blow air into the room to induce airflow along a radiating wall of the hydronic radiant thermal system 50, i.e., along the external face 11a of the thermal wall 1, particularly, along an area of the external face 11a beyond which the conduit 15 lies.

The air convection system 300 comprises an air inlet 301 and an air outlet 302 formed on two perpendicular faces of an air duct 320 embedded in a designated space 330 in a corner of a room, alongside the wall 1. The air convection system 300 further comprises an air flow generating arrangement e.g., a series of fans 306 positioned within the air duct 320 configured to induce airflow between the air inlet 301 and the air outlet 302.

Both the air outlet 302 and the air inlet 301 herein, are in fluid communication with the interior of the room, to facilitate circulation of air within the room, It should be appreciated that the air outlet 302 herein is shaped to direct the airflow generated by the series of fans 306 along an air blowing axis 302a extending parallel to the external face 11a of the thermal wall 1, to contribute to the heat convection from the external face 11a, to the interior of room.

The air flowing along the external face 11a, is heated/cooled by the external face 11a before flowing indirectly into the interior of the room. Such indirect flow minimizes negative impact of the air convection system to the thermal comfort in the room. Particularly, the air outlet 302 defines an effective air outlet plain 302b, to which the air blowing axis is perpendicular, which forms an angle of 90 degrees with the external face 11a.

The airflow generating arrangement, i.e., the series of fans 306, is controlled by a control system 310.

The control system 310 (schematically illustrated), comprises a controller 312 operatively connected to the series of fans 306, and a temperature sensor 313 positioned distal from the wall 1, within the room, configured to sense the temperature in the room. The controller 312 is configured to operate the series of fans 306 in response to readings of the temperature sensor 313, e.g., to turn on/increase the intensity of the blowing of air through the air outlet 302, i.e, the speed of operation of the fans 306, when temperature sensed by the temperature sensor 313 drops below a predetermined threshold value.

Such arrangement allows fast response of the thermal construction assembly 400 to changes in temperature within the room.

The operation of the series of fans 306 should be performed when the conduit 15 radiates/absorbs heat into/from the room. For that purpose, the control system 310 can be operatively connected to the hydronic radiating thermal system 50 so as to sense the state thereof. Particularly, the control system 310 can include an auxiliary sensor configured to sense a parameter indicative of a contemporary flux of heat radiation/absorption through the external face 11a of the thermal panel 11, thereby determining when the heat radiating/absorbing element radiates/absorbs heat through said external face.

The auxiliary sensor can be operatively connected to components of the radiant thermal system 50 configured to influence the radiation/absorption of heat through the external face 11a into/from the room, i.e., the pump 51 or heat exchanger 52, thereby determining when the heat radiating/absorbing element radiates/absorbs heat through said external face. Alternatively, the auxiliary sensor can be a temperature sensor positioned on the wall 1 such that it can sense the temperature on the external face 11b of the wall 1.

Such arrangement adds another aspect of heat transfer into the room in a cost-effective and efficient way. It should be appreciated that radiant cooling/heating time intervals are relatively long with respect to the needs of humans for obtaining thermal comfort. Such arrangement enables rapid responsivity to changes in thermal comfort in the room. The blowing of air along the external face rather than directly into the room, is configured to improve the thermal comfort in the room.

The blowing of air along the wall rather than directly into the interior of the room as in conventional A/C, reduces damage to thermal comfort in the room.

In other embodiments of the presently disclosed subject matter, the control system 310 can include an additional sensor configured to sense another parameter indicative of the thermal comfort in the room, optionally according to a thermal comfort standard, e.g., ASHRAE 55, ISO 7730. These parameters can include technical parameters such as humidity, air speed, air temperature, mean radiant temperature, or human parameters such as skin temperature, metabolic rate, etc.

The invention claimed is:

1. A non-contact actuation assembly configured to operate a communication line of an infrastructure system through a panel having an external face configured to be directed into an interior of a building structure, and an opposite internal face, said assembly comprising:
   an actuator configured to be positioned adjacent said external face by a user during operation, said actuator comprising an actuating member constituted by at least one of a magnetic member and a magnetizable member; and
   an operator configured to be disposed adjacent said internal face during operation, and control communication at said communication line, said operator comprising an operating member constituted by a matching one of said magnetic member and said magnetizable member;
   wherein upon said positioning of said actuator adjacent said external face, in register with said operator, said actuating member and said operating member are configured to be magnetically coupled such that said operator is switchable, upon disposition of said actuator member with respect to said external face, at least between a first state in which communication in said communication line is established and a second state in which communication in said communication line is obstructed.

2. The non-contact actuation assembly according to claim 1, wherein the operator comprises a line portion of the communication line, so that at the first state, the line portion is aligned with the rest of the communication line, and at the second state, the line portion is misaligned with the rest of the communication line, thereby obstructing communication therethrough.

3. The non-contact actuation assembly according to claim 1, wherein said communication line is a fluid communication line.

4. The non-contact actuation assembly according to claim 3, wherein said fluid is liquid.

5. The non-contact actuation assembly according to claim 4, wherein said operator comprises a conduit portion configured to constitute a part of the liquid communication line at least at said first state of said operator.

6. The non-contact actuation assembly according to claim 1, wherein both of said actuating member and said operating member are constituted by magnetic members.

7. The non-contact actuation assembly according to claim 6, wherein said actuating member and said operating member have corresponding structures, such that upon said positioning of said actuator adjacent said external face, in register with said operator, said actuating member automatically acquires a position indicative of the state of said operating member.

8. The non-contact actuation assembly according to claim 7, wherein said actuator comprises a housing accommodating said actuating member, allowing rotation thereof with respect thereto.

9. The non-contact actuation assembly according to claim 1, wherein said actuating member is elongated.

10. The non-contact actuation assembly according to claim 9, wherein said housing comprises a legend configured to assist a user in indicating the state of the operator.

* * * * *